United States Patent [19]

Fraser et al.

[11] 4,243,619
[45] Jan. 6, 1981

[54] PROCESS FOR MAKING FILM FROM LOW DENSITY ETHYLENE HYDROCARBON COPOLYMER

[75] Inventors: William A. Fraser, Princeton; Gary S. Cieloszyk, Somerville, both of N.J.

[73] Assignee: Union Carbide Corporation, New York, N.Y.

[21] Appl. No.: 12,795

[22] Filed: Feb. 16, 1979

Related U.S. Application Data

[63] Continuation-in-part of Ser. No. 892,324, Mar. 31, 1978, abandoned.

[51] Int. Cl.³ .......................... B29D 7/04; B29D 7/22
[52] U.S. Cl. .................................. 264/40.6; 264/564; 264/237; 526/128
[58] Field of Search ........... 264/176 R, 40.1, 563-564, 264/565, 566, 569, 237, 216, 40.6, 210.1; 526/128

[56] References Cited

U.S. PATENT DOCUMENTS

| | | | |
|---|---|---|---|
| 2,763,029 | 9/1956 | Tulloss, Jr. | 264/569 |
| 3,226,459 | 12/1965 | Tijunelis | 264/563 |
| 3,243,486 | 3/1966 | Pilaro | 264/565 |
| 3,456,044 | 7/1969 | Pahlke . | |
| 3,509,116 | 4/1970 | Cote et al. | 260/88.2 R |
| 3,694,524 | 9/1972 | Tinger et al. | 264/209 |
| 3,754,067 | 8/1973 | St. Eve et al. | 264/569 |
| 3,862,285 | 1/1975 | North et al. | 264/569 |
| 3,867,083 | 2/1975 | Herrington | 425/326.1 |
| 3,959,425 | 5/1976 | Herrington | 264/569 |
| 3,976,732 | 8/1976 | Herrington | 264/569 |
| 4,000,234 | 12/1976 | Pilgrim et al. | 264/563 |
| 4,022,558 | 5/1977 | Herrington | 425/72 R |
| 4,076,698 | 2/1978 | Anderson | 260/88.2 R |
| 4,082,880 | 4/1978 | Zboril . | |

FOREIGN PATENT DOCUMENTS

| | | |
|---|---|---|
| 1427792 | 1/1966 | France . |
| 2016661 | 4/1969 | France . |
| 2252194 | 11/1974 | France . |
| 2302836 | 3/1976 | France . |
| 1035887 | 7/1966 | United Kingdom . |
| 1532780 | 11/1978 | United Kingdom . |

Primary Examiner—Jeffery R. Thurlow
Attorney, Agent, or Firm—James J. O'Connell

[57] ABSTRACT

A process for making film from a narrow molecular weight distribution low density ethylene hydrocarbon copolymer, which process comprises extruding said copolymer through a die gap of greater than about 50 mils. The film exhibits an excellent balance of optical and mechanical properties.

25 Claims, 6 Drawing Figures

PROCESS FOR MAKING FILM FROM LOW DENSITY ETHYLENE HYDROCARBON COPOLYMER

This application is a continuation-in-part of copending application Ser. No. 892,324 filed Mar. 31, 1978, now abandoned.

FIELD OF THE INVENTION

This invention relates to a process for forming films from low density ethylene hydrocarbon copolymers, methods for controlling properties of said film and a film containing said low density ethylene hydrocarbon copolymer. The film so produced is essentially free from melt fracture.

DESCRIPTION OF THE PRIOR ART

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an a intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

Low density polyethylene can also be produced at low to medium pressures by copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad. The films formed from certain ethylene hydrocarbon copolymers made by the process, hereinafter described exhibit new and novel combinations of optical, mechanical, and shrinkage properties.

Low density polyethylene can exhibit a multitude of properties. It is flexible and has a good balance of mechanical properties such as tensile strength, impact resistance, burst strength, and tear strength. In addition it retains its strength down to relatively low temperatures. Certain resins do not embrittle at temperatures as low as −70° C. Low density polyethylene has good chemical resistance. It is relatively inert to acids alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack mechandise, industrial liners, shipping sacks, pallet stretch and shrink wrap. Large quantities of wide heavy gage film are used in construction and agriculture.

Most low density polyethylene film is produced by the tubular blown film extrusion process. Products range from 2 in. in diameter, or smaller, tubes of film to be used as sleeves or pouches, to huge bubbles that provide a lay flat of 20 feet in width, which, when slit along an edge and opened up, will measure 40 feet wide.

Low Density Polyethylene: Rheology

The rheology of polymeric materials depends to a large extent on molecular weight and molecular weight distribution. Studies of high pressure low density polyethylene have also shown the importance of long chain branching. In film extrusion, two aspects of rheological behavior are important: shear and extension. Within a film extruder and extrusion die, a polymeric melt undergoes severe shearing deformation. As the extrusion screw pumps the melt to and through the film die, the melt experiences a wide range of shear rates. Most film extrusion processes are thought to expose the melt to shear at rates in the 100–5000 sec$^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\dot{\gamma}$) decreases. The degree of viscosity decrease depends upon the molecular weight, its distribution, and molecular conformation, i.e., long chain branching of the polymeric material. Short chain branching has little effect on shear viscosity. In general, broad molecular weight distribution resins show enhanced shear thinning behavior in the shear rate range common to film extrusion. Long chain branching can also enhance this behavior. Narrow molecular weight distribution resins exhibit reduced shear thinning behavior at extrusion grade shear rates. The consequences of these differences are that narrow distribution resins require higher power and develop higher pressures during extrusion than broad molecular weight distribution resins of equivalent average molecular weight.

The rheology of polymeric materials is customarily studied in shear deformation. In pure shear the velocity gradient of the deforming resin is perpendicular to the flow direction. This mode of deformation is experimentally convenient but does not convey the essential information for understanding material response in film fabrication processes. As one can define a shear viscosity in terms of shear stress and shear rate, i.e.:

$$\eta \text{ shear} = \tau 12/\dot{\gamma} \tag{1}$$

where
$\eta \text{shear}$ = shear viscosity (poise)
$\tau 12$ = shear stress (dynes/cm$^2$)
$\dot{\gamma}$ = shear rate (sec$^{-1}$)

an extensional viscosity can be defined in terms of normal stress and strain rate, i.e.,:

$$\eta \text{ext} = \sigma \| /\dot{\epsilon} \tag{2}$$

$\eta \text{ext}$ = extensional viscosity (poise)
$\sigma \|$ = normal stress (dynes/cm$^2$)

$\dot{\epsilon}$ = strain rate (sec$^{-1}$)

In pure extensional flow, unlike shear flow, the velocity gradient is parallel to the flow direction. Commercial extrusion processes involve both shear and extensional deformations. In film extrusion (tubular blown and slot cast) the extensional rheology characteristics of a resin are exceedingly important. They may, in fact, dominate the process.

Extensional viscosity can be measured by a number of experimental techniques (see, for example, J. L. White, Report No. 104 of the Polymer Science and Engineering Dept., Univ. of Tenn., Knoxville). The procedure used herein is a constant strain rate method. Briefly, the method uses a servo-controlled Instron tensile testing machine. The ends of a molten ring of polymer, immersed in a silicone oil bath, are separated at an accelerating rate according to the following relationship.

$$L(t) = L_o \exp(\dot{\epsilon} t) \qquad (3)$$

where
L(t) = jaw separation at time t.
$L_o$ = initial jaw separation
$\dot{\epsilon}$ = strain rate (sec$^{-1}$), a constant
t = time A force transducer measures load during the deformation. Extensional viscosity is calculated by dividing stress by strain rate and is determined as a function of displacement or time during the deformation (Temp. ~150° C.).

When high pressure low density polyethylene melts are deformed according to equation (3), extensional viscosity is observed to increase at an accelerating rate with log time. This behavior is shown in FIG. 1 for high pressure polymerized low density polyethylene having a melt index of 0.65 and a density of 0.922. The melt is said to strain harden. This strain hardening intensifies as the strain rate is increased. In some cases the melt may exhibit unbounded stress growth.

Transition metal catalyzed ethylene hydrocarbon copolymers do not, in general, show unbounded stress growth. Certain broad molecular weight distribution resins to strain harden, but their extensional viscosity seems to increase linearly with log time (See FIG. 2). Certain narrow molecular weight distribution resins, such as those which are hereinafter described, show little strain hardening when strain rates are low. FIG. 3 shows that strain hardening intensifies at higher strain rates but not to the degree observed in high pressure low density polyethylene or ethylene hydrocarbon copolymers having broad molecular weight distribution.

High pressure low density polyethylene can be considered "soft" in shear and "stiff" in extension when compared to ethylene hydrocarbon copolymers of narrow molecular weight distribution. Ethylene hydrocarbon copolymers having a narrow molecular weight distribution exhibit the opposite rheology. They are "stiff" in shear and "soft" in extension. The terms "soft" and "stiff", as used herein, refer to the relative magnitude of shear and extensional viscosity when comparing the rheology of high pressure low density polyethylene and narrow molecular distribution ethylene hydrocarbon copolymers. An improved process for extruding film from molten, ethylene hydrocarbon copolymers having a narrow molecular weight distribution, has been developed as hereinafter described.

Low Density Polyethylene: Film Extrusion

Low density polyethylene is extruded into film by conventional film extrusion techniques such as blown film extrusion and slot cast extrusion. The die gap of the dies of the extrusion device used in extruding film from high pressure low density polyethylene is generally kept narrow, in the range of 15 to ≦45 mils. These narrow die gaps accommodate the "soft" shear and "stiff" extensional rheology of these resins. In narrow die gap blown film extrusion, MD drawdown, i.e., the ratio of die gap to the product of final film thickness and blow up ratio, is held relatively low. This is done to reduce the amount of downgauging which must be accomplished in extension. High pressure low density polyethylene melts, as discussed above, can show unbounded stress growth during extensional deformation. The high pressure low density polyethylene melts are said to exhibit good melt strength. In blown film extrusion, this behavior imparts good "bubble stability" to the process but restricts the level of drawdown which can be achieved. As the extrudate is deformed in extension, melt stress builds up, leading to orientation and unbalanced film properties. If the deformation is excessive or if done rapidly, i.e., at a high strain rate, this melt stress can exceed the strength of the melt and the extrudate breaks. High pressure low density polyethylene resins can achieve high drawdowns only under carefully controlled conditions. The resin must generally have a high melt index and must be exceedingly clean. Contamination of any sort, foreign particles, unhomogenized melt, high molecular weight gel, crosslinked gel, etc. will act as stress concentration points causing blow holes to form and the tubular bubble to collapse.

In slot cast extrusion melt temperatures are generally significantly higher (100°-200° F.) than those used in blown film extrusion. Higher drawdowns can be achieved. Generally, however, the extensional deformation rates used in this film extrusion process are significantly higher than those used in blown film extrusion. The strain hardening extensional rheology of high pressure low density polyethylene manifests itself, in this process, by the effect it has on the mechanical properties of slot cast, high pressure low density polyethylene film. High deformation rate slot extrusion with high pressure low density polyethylene resin results in film with highly imbalanced properties. Machine direction strengths increase with drawdown while transverse direction strength properties decrease dramatically. Ultimate elongation of the film in the machine direction (MD) can become very low. Elmendorf tear strength in the transverse direction (TD) can also become quite low.

Narrow molecular weight distribution, transition metal catalyzed, ethylene hydrocarbon copolymers can also be extruded into film by conventional techniques such as blown film extrusion and slot cast extrusion. When extruded through narrow gap dies, however, these resins generate very high extrusion head pressures. Shear stresses are high and the extrudate tends to melt fracture. These shear related problems severely limit extruder output rate. It has now been found that when the die gaps of the extrusion device used in extruding films from these resins are greater than about 50 mils, extruder output rate can be increased significantly. By practicing this invention, drawdown can become quite high. Head pressures, shear stresses in the die, and the tendency of the resin to melt fracture are all reduced. Melt fracture refers to the phenomenon in which a resin extrudate becomes rough and nonuniform due to melt instabilities during polymer flow. When the polymer extrudate takes the form of a film, surface distortions, induced by melt fracture can be "frozen-in" as the extrudate cools and solidifies. These surface distortions can seriously detract from the mechanical strength of the film. Increasing the die gap of the extrusion device reduces shear stresses at a given output rate and can eliminate melt fracture. By practicing this invention drawdown can become quite high. In essence, extensional deformation is substituted for shear deformation. This process thus accomodates the "stiff" shear and "soft" extensional rheology of these narrow molecular weight distribution ethylene hydrocarbon copolymers. Furthermore, the large extensional deformations used in this process can be accomplished without causing the film to become highly oriented. The resins, as defined herein, exhibit excellent drawdown characteristics. Melt stress does not develop to the degree experienced with high pressure low density polyethylene. Very high deformation rates and/or drawdowns are required before melt stress exceeds the strength of the extrudate. High drawdown film can be produced with wide processing latitude. Contamination is not a problem. Foreign particles or gel do not act as stress concentration points. In blown film extrusion, freedom from blow holes is greatly enhanced. Very thin film of 0.1 mil gauge, for example, can be produced with an excellent balance of optical and mechanical properties. Even the very thin gauge film is characterized by relatively balanced mechanical properties and relatively low thermal shrinkage. In slot cast extrusion, film can be produced with properties relatively insensitive to drawdown. (Drawdown in the slot cast process is defined as die gap/film gauge ratio). Tensile strength and ultimate elongation are little affected by drawdown. Elmendorf tear strength, both MD and TD, can be maintained at acceptable levels.

Low Density Polyethylene: Structure and Property/Process Interactions

The tubular blown film extrusion process has been in existence for over twenty years. The effect of extrusion variables on the optical and mechanical properties of high pressure low density polyethylene tubular blown film has been discussed at length by Huck, N. D. and Clegg, P. L. (SPE Transactions, pp 121-132, July 1961). The optical properties of high pressure low density polyethylene films, i.e., haze and gloss, are governed for the most part, by surface irregularities caused by melt flow phenomena and crystallization behavior. In tubular blown, high pressure low density polyethylene film, the most important surface irregularities scattering light are extrusion defects originating from the complex elastic melt flow behavior in the extrusion die itself. A second cause of light scattering is surface irregularities arising from the growth and aggregation of crystallites at or near the surface of the film. This growth buckles the surface of the film, and the magnitude of the effect depends on the rates of crystallite nucleation and growth during cooling. Refractive index variations at the crystalline-amorphous phase boundaries also scatter light. Since extrusion defects are the major cause of poor optics in tubular blown, high pressure low density polyethylene film, a specialized operating procedure has evolved for controlling film opticals with these materials. In certain tubular blown ethylene hydrocarbon copolymer films, the most important irregularities scattering light are crystallization induced defects. The films of this invention are extruded from ethylene hydrocarbon copolymers in which the short chain branching distribution is very broad. These materials can generate very large spherulites during cooling. Operating procedures, quite distinct from those practiced with high pressure low density polyethylene, are required to control blown film opticals with these transition metal catalyzed resins. These operating procedures constitute another aspect of the invention herein.

Films suitable for packaging applications must possess a balance of key properties in order to meet the performance requirements essential for broad end use utility and wide commercial acceptance. These properties include film optical quality, for example, haze, gloss, and see-through characteristics. Mechanical strength properties such as puncture reistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability, and flex resistance. High pressure low density polyethylene has a wide range of utility such as in food packaging and non-food packaging applications. Bags, commonly produced from low density polyethylene, include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc. Thin film is used in capacitors, as described in copending U.S. patent application Ser. No. 892,125 filed in the names of T. E. Nowlin et al and entitled "Electrical Device With Dielectric Film of Ethylene Hydrocarbon Copolymer", filed on Mar. 31, 1978, now abandoned.

Low density polyethylene film may be thermoformed and also may be laminated. The film may be laminated to itself in order to build up a series of layers or it may be laminated to other materials by well known prior art methods.

Possessing a unique combination of the aforedescribed properties, high pressure low density polyethylene is the most important of the thermoplastic packaging films. It accounts for about 50% of the total usage of such films in packaging. The ethylene hydrocarbon copolymer films of the present invention offer an improved combination of end use properties and are especially suited for many of the applications already served by high pressure low density polyethylene.

An improvement in any one of the properties of a film or an improvement in the extrusion characteristics of the resin or an improvement in the film extrusion process itself is of the utmost importance regarding the acceptance of the film as a substitute for high pressure low density polyethylene in many end use applications.

DRAWINGS

SUMMARY OF THE INVENTION

Figure 1:
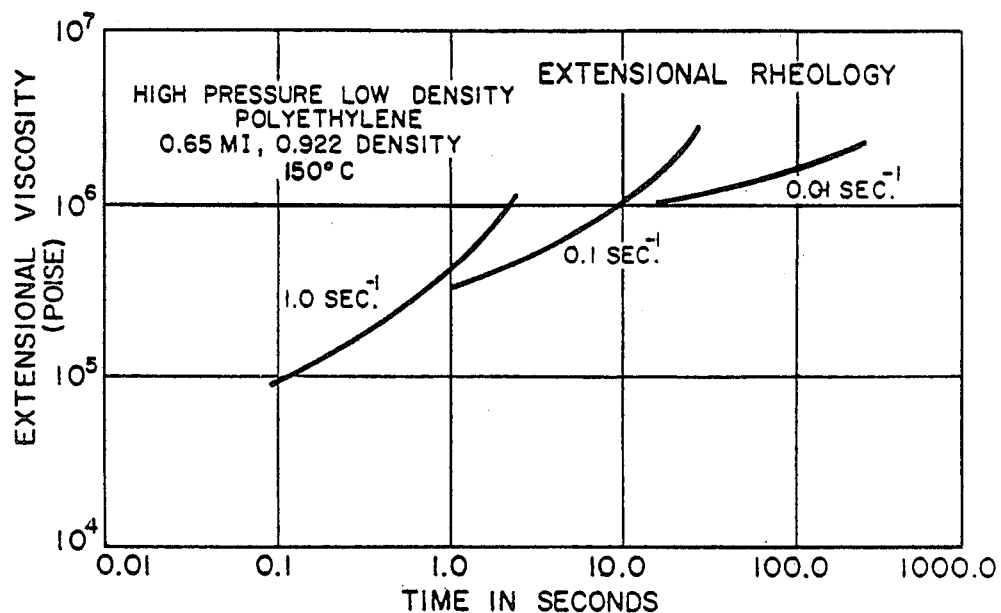
FIGS. 1, 2 and 3 show extensional viscosity-log time plots for three types of low density polyethylene.
Figure 2:
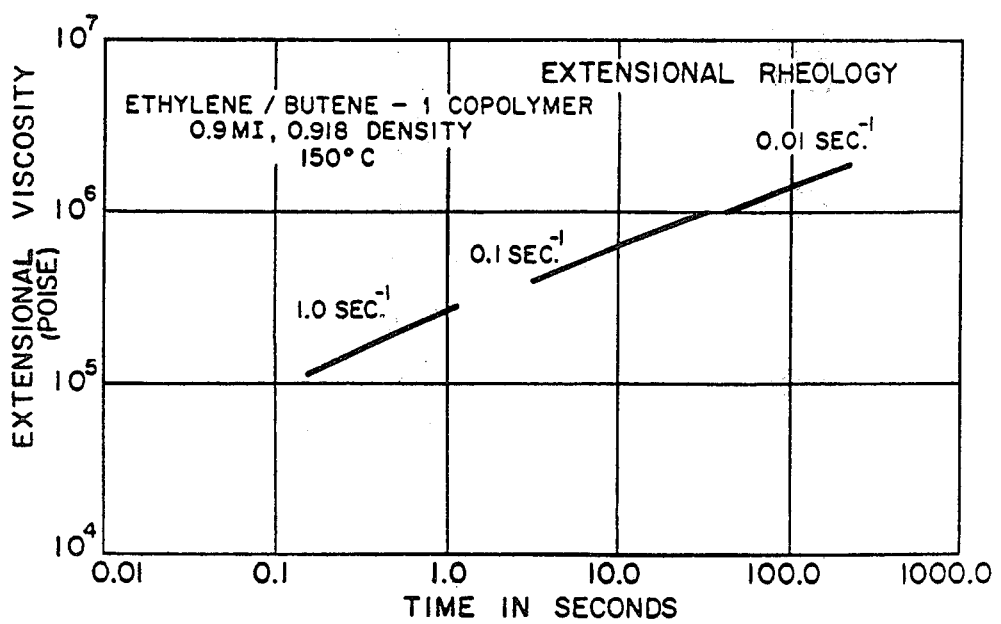
Figure 3:
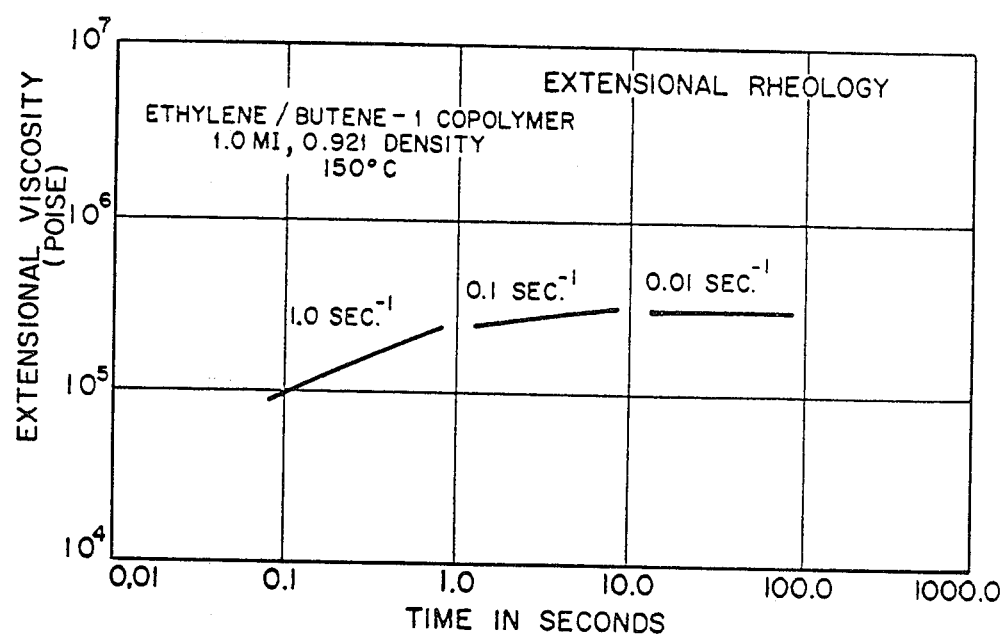

It has now been found that thin film having a combination of properties of improved puncture resistance, high ultimate elongation, low thermal shrinkage and outstanding tensile impact strength and essentially free from melt fracture is formed from low density ethylene hydrocarbon copolymers by extruding said copolymer through an extrusion die having a gap of greater than about 50 mils.

An object of the present invention is to provide an improved process for extruding narrow molecular weight distribution, ethylene hydrocarbon copolymer films by extruding said copolymer through an extrusion die having a gap greater than about 50 mils. The present invention applies only to narrow molecular weight distribution ethylene hydrocarbon copolymers as described herein. This improved process of film extrusion eliminates melt fracture with said copolymers and, because of the nature of their rheology, the increased drawdown accompanying the practice of this invention does not induce excessive molecular orientation and therefore does not cause unacceptable, directionally imbalanced properties.

A further object of the present invention is to provide methods to improve the optical properties of blown film extruded from molten ethylene hydrocarbon copolymers by controlling the cooling rate and by the addition of certain heterogeneous nucleating additives.

Another object of the present invention is to provide a film comprising a blend of ethylene hydrocarbon copolymer and high pressure low density polyethylene.

Another object of the present invention is to improve the processability and properties of film extruded from molten ethylene hydrocarbon copolymer by adding a high pressure low density polyethylene thereto.

Another object of the present invention is to provide a film of ethylene hydrocarbon copolymer having a thickness down to about 0.10 mils while retaining a puncture resistance of greater than about 7.0 in-lbs/mil.

DESCRIPTION OF THE PREFERRRED EMBODIMENT

(1) The Low Density Ethylene Hydrocarbon Copolymers

The low density ethylene hydrocarbon copolymers from which the films of the present invention are extruded, possess a molecular weight distribution, Mw/Mn, of about $\geq 2.7$ to $\leq 4.1$ and preferably of about $\geq 2.8$ to $\leq 3.4$. The copolymers have a melt flow ratio of about $\geq 22$ to $\leq 32$ and, preferably, $\geq 25$ to $\leq 32$. The melt flow ratio range of $\geq 22$ to $\leq 32$ thus corresponds to a Mw/Mn value range of about 2.7 to 3.6 and the melt flow ratio range of $\geq 25$ to $\leq 32$ corresponds to a Mw/Mn range of about 2.8 to 3.6. These ethylene hydrocarbon copolymers also have a total unsaturation content of about $\geq 0.1$ to $\leq 0.3$ C=C per 1000 carbon atoms and, preferably, of about $\geq 0.14$ to $\leq 0.24$ C=C per 1000 carbon atoms.

The low density ethylene hydrocarbon copolymers from which the films of the present invention are extruded are further characterized as copolymers of ethylene and at least one $C_3$ to $C_8$ alpha olefin and may be produced in accordance with the procedures as set forth in U.S. patent application Ser. No. 892,325, filed Mar. 31, 1978, and refiled as Ser. No. 014,414 on Feb. 27, 1979, pending in group in the names of F. J. Karol et al and entitled "Preparation of Ethylene Copolymers in Fluid Bed Reactor", and hereinafter described, and the procedures set forth in U.S. patent application Ser. No. 892,322, filed Mar. 31, 1978, and refiled as Ser. No. 012,720 on Feb. 16, 1979, pending in group in the names of G. L. Goeke et al and entitled "Impregnated Polymerization Catalyst, Process For Preparing, and Use For Ethylene Copolymerization" as well as procedures which will produce ethylene hydrocarbon copolymers with the properties as heretofore described. U.S. application Ser. No. 014,414 corresponds to European patent application No. 79100953.3 which was opened to the public on Oct. 17, 1979 as Publication No. 4645 and U.S. application Ser. No. 012720 corresponds to European patent application No. 79100958.2 which was opened to the public on Oct. 17, 1979 as Publication No. 4647.

The copolymers are copolymers of a major mol percent ($\geq 90$) of ethylene and a minor mol percent ($\leq 10$) of one or more $C_3$ to $C_8$ alpha olefins.

The $C_3$ to $C_8$ alpha olefins include propylene, butene-1, pentene-1, heptene-1, 4-methyl pentene-1, heptene-1 and octene-1.

The copolymers have a density of about $\geq 0.912$ to $\leq 0.940$ and preferably of about $\geq 0.916$ to $\leq 0.928$, have a volatiles content (TEA, thermal evolution analysis) of about 0.05 to 0.35 weight percent. Additionally, they have a standard melt index of $\geq 0.1$ to $\leq 5.0$ and preferably of about $> 0.5$ to $\leq 4.0$.

The copolymers used in the present invention can be readily produced in a low pressure gas phase fluid bed reactor as disclosed below by polymerizing the monomer charge under a specific set of operating conditions as disclosed below and in the presence of a specific high activity catalyst which is also described below.

High Activity Catalyst

The compounds used to form the high activity catalyst used in the present invention comprise at least one titanium compound, at least one magnesium compound, at least one electron donor compound, at least one activator compound and at least one inert carrier material, as defined below.

The titanium compound has the structure

wherein
- R is a $C_1$ to $C_{14}$ aliphatic or aromatic hydrocarbon radical, or COR' where R' is a $C_1$ to $C_{14}$ aliphatic or aromatic hydrocarbon radical,
- X is selected from the group consisting of Cl, Br, I, or mixtures thereof, a is 0 or 1, b is 2 to 4 inclusive and a+b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $MgX_2$ wherein X is selected from the group consisting if Cl, Br, I, or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ethers; $C_3$ to $C_6$, and preferably $C_3$ to $C_4$, aliphatic ketones; The most preferred of these electron donor compounds would include methyl formate, ethyl acetate, butyl acetate, ethyl ether, hexyl ether, tetrahydrofuran, dioxane, acetone, acetone and methyl isobutyl ketone.

The electron donor compounds can be used individually or in combinations thereof.

About 2 to 85, and preferably about 3 to 10, mols of the electron donor compound as used per mol of Ti.

The activator compound has the structure $Al(R'')_c X'_d H_e$ wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound is activating the catalyst employed in the present invention.

The carrier materials are solid, particulate materials which are inert to the other components of the catalyst composition, and to the other active components of the reaction system. These carrier materials would include inorganic materials such as oxides of silicon and aluminium and molecular sieves, and organic materials such as olefin polymers such as polyethylene. The carrier materials are used in the form of dry powders having an average particle size of about 10 to 250, and preferably of about 50 to 150, microns. These materials are also preferably porous and have a surface area of $\geq 3$, and preferably of $\geq 50$, square meters per gram. The carrier material should be dry, that is, free of absorbed water. This is normally done by heating or pre-drying the carrier material with a dry inert gas prior to use. The inorganic carrier may also be treated with about 1 to 8 percent by weight of one or more of the aluminum alkyl compounds described above to further activate the carrier.

CATALYST PREPARATION

The catalyst used herein is prepared by first preparing a precursor composition from the titanium compound, the magnesium compound, and the electron donor compound, as described below, and by then treating the precursor composition with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and, in some instances by refluxing, these two compounds in the electron donor compound. When the titanium compound and the magnesium compound are dissolved, the precursor composition is isolated by crystallization or by precipitation with a $C_5$ to $C_8$ aliphatic or aromatic hydrocarbon such as hexane, isopentane or benzene.

The crystallized or precipitated precursor composition is isolated in the form of fine, free flowing particles having an average particle size of about 10 to 100 microns and a settled bulk density of about 18 to 33 pounds per cubic foot.

Particle sizes of $\leq 100\mu$ are preferred for use in a fluid bed process. The particle size of the isolated precursor composition can be controlled by the rate of crystallization or precipitation.

When thus made as disclosed above, the precursor composition has the formula $Mg_m Ti_1 (OR)_n X_p [ED]_q$ wherein
ED is the electron donor compound,
m is $\geq 0.5$ to $\leq 56$, and preferably $\geq 1.5$ to $\leq 5.0$,
n is 0 to 1,
p is $\geq 6$ to $\leq 116$, and preferably $\geq 6$ to $\leq 14$,
q is $\geq 2$ to $\leq 85$, and preferably $\geq 4$ to $\leq 11$,
R is a $C_1$ to $C_{14}$ aliphatic or aromatic hydrocarbon radical, or COR' wherein R' is a $C_1$ to $C_{14}$ aliphatic or aromatic hydrocarbon radical and,
X is selected from the group consisting of Cl, Br, I, or mixtures thereof.

The subscript for the element titanium (Ti) is the arabic numeral one.

The polymerization activity of the completely activated catalyst is so high, in the process of the invention, that a dilution of the precursor composition with the carrier material is necessary in order to effectively control the reaction rate. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

In order to be used in the process of the present invention the precursor composition must be fully or completely activated, that is, it must be treated with sufficient activator compound to transform the Ti atoms in the precursor composition to an active state. It has been found, however, that the manner of activating the catalyst is very critical in order to obtain an active material, even when an inert carrier is present. Attempts to activate the catalyst by a process similar to that of U.S. Pat. No. 3,989,881, for example, wherein the total amount of reducing agent theoretically needed to fully activate the catalyst was added to the precursor composition in a hydrocarbon slurry, followed by drying of the slurry at temperatures of $\geq 20°$ to $\leq 80°$ C. to remove the solvent therefrom to facilitate the use of the catalyst in a gas phase process, produced a product which was not sufficiently active in the gas phase fluid bed process otherwise described below for commercial purposes.

It has been found that, in order to prepare a useful catalyst, it is necessary to conduct the activation in such a way that, at least, the final activation stage must be conducted in the absence of solvent so as to avoid the need for drying the fully active catalyst to remove solvent therefrom. Two procedures have been developed to accomplish this result. In one procedure, the precursor composition is completely activated, outside the reactor, in the absence of solvent, by dry blending the precursor composition with the activator compound. In this dry blending procedure the activator compound is preferably used while absorbed on a carrier material. This procedure had a disadvantage, however, in that the resulting dry, fully activated catalyst is pyrophoric where it contains >10 weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound.

Thus, in the dry blending catalyst making procedure, the solid particulate precursor composition is added to and evenly blended with solid particles of porous carrier material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about $\geq 10$ weight percent of the activator compound, they will be pyrophoric. During the dry blending operation, which may be conducted at ambient (25° C.) or lower temperatures, the dry mixture is well agitated to avoid any heat build-up during the ensuing reduction reaction which is exothermic, initially. The resulting catalyst is thus completely reduced and activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially reduced by enough activator compound so as to provide a partially activated precursor composition which has an activator compound/Ti molar ratio of about 1 to 10:1 and preferably of about 4 to 8:1. This partial reduction reaction is preferably carried out in a hydrocarbon solvent slurry followed by drying of the resulting mixture, to remove the solvent, at temperatures between 20 to 80, and preferably of 50° to 70° C. In this partial activation procedure the activator compound may be used while absorbed on the carrier material used to dilute the activator compound. The resulting product is a freeflowing solid particulate material which can be readily fed to the polymerization reactor. The partially activated precursor composition, however, is, at best, weakly active as a polymerization catalyst in the process of the present invention. In order to render the partially activated precursor composition active for ethylene polymerization purposes, additional activator compound must also be added to the polymerization reactor to complete, in the reactor, the activation of the precursor composition. The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator compound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al/Ti molar ratio of about 10 to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition are continuously fed to the reactor, with discrete portions of any additional activator compound needed to complete the activation of the partially activated precursor composition, during the continuing polymerization process in order to replace active catalyst sites that are expended during the course of the reaction.

THE POLYMERIZATION REACTION

The polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 1$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that must be copolymerized with ethylene in order to provide polymers having the desired density range at any given melt index. The listing also indicates the relative molar concentration, of such comonomer to ethylene, which must be present in the gas stream of monomers which is fed to the reactor.

| Comonomer | mol % needed in copolymer | Gas Stream Comonomer/Ethylene molar ratio |
|---|---|---|
| propylene | 3.0 to 10 | 0.2 to 0.9 |
| butene-1 | 2.5 to 7.0 | 0.2 to 0.7 |
| pentene-1 | 2.0 to 6.0 | 0.15 to 0.45 |
| hexene-1 | 1.0 to 5.0 | 0.12 to 0.4 |
| octene-1 | 0.8 to 4.5 | 0.10 to 0.35 |

Figure 4:
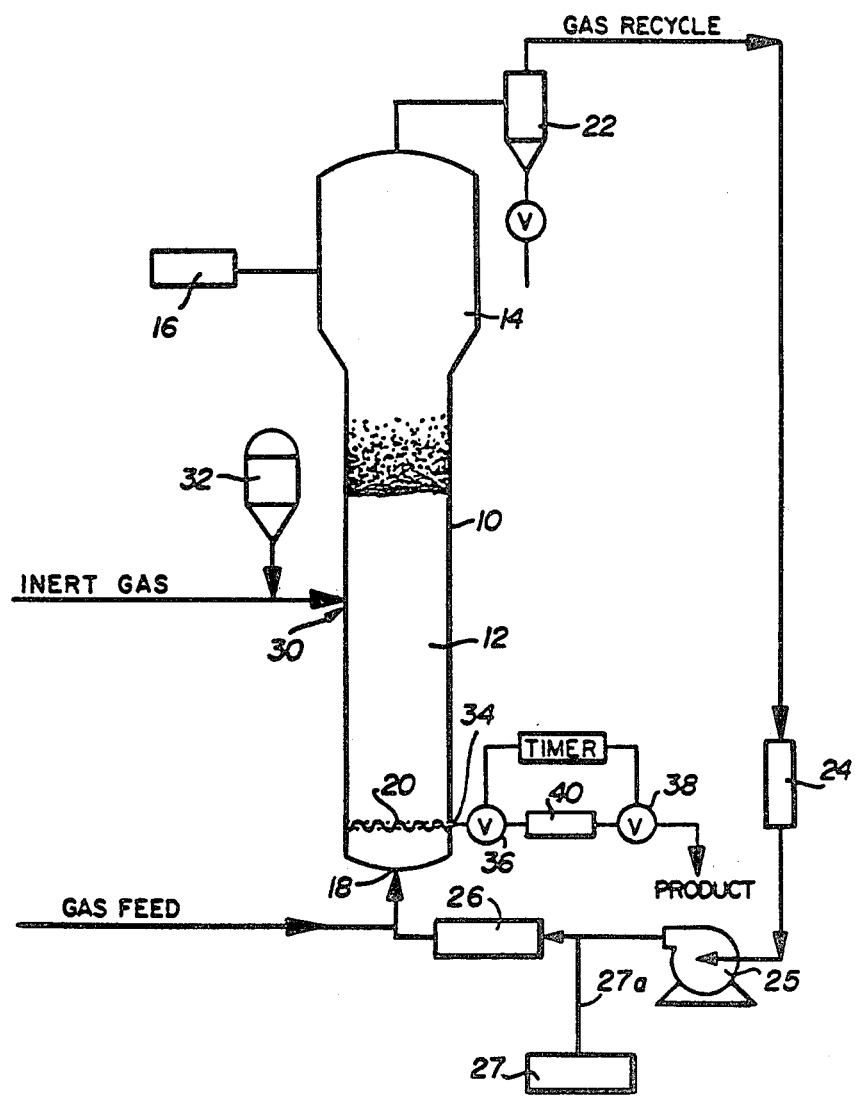
FIG. 4 shows a fluid bed reactor in which the ethylene hydrocarbon copolymers may be prepared.

A fluidized bed reaction system which can be used in the practice of the process of the present invention is illustrated in FIG. 4. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt index values of the copolymers that are produced. About 0 to 50, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about >0.92 to 0.94.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is rejected into the bed at a rate equal to its consumption at a point 30 which is above the distribution plate 20. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accomodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention appears to yield a fluid bed product having an average particle size between about 0.005 to about 0.07 inches and preferably about 0.02 to about 0.04 inches.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

(2) Film

The film produced by the method of the present invention has a thickness of greater than about 0.10 mils to about 20 mils, preferably greater than about 0.10 to 10 mils, most preferably greater than about 0.10 to 6.0 mils. The 0.10 to 6.0 mil film is characterized by the following properties: a puncture resistance value of greater than about 7.0 in-lbs/mil; an ultimate elongation of greater than about 400%; a thermal shrinkage of less than 3% after heating to 105°-110° C. and cooling to room temperature; tensile impact strength of greater than about 400 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice. Also a particularly desirable processing aid which results in enhanced "bubble stability" in the blown film extrusion process, as will hereinafter be discussed, is a blend of ethylene hydrocarbon copolymer and 1-20 wt. % of high pressure low density polyethylene.

Additionally, heterogeneous nucleation additives can be added to the copolymers herein which improve the optical properties of the film formed from these copolymers. Unlike high pressure low density polyethylene where the optical properties are governed primarily by rheological factors, the optical properties of the ethylene hydrocarbon copolymers of the present invention are controlled by crystallization effects. The heterogeneous nucleation additives provide additional sites to initiate crystallization in the ethylene hydrocarbon copolymers of the present invention. An increase in the crystallization and nucleation rate and crystallization temperature and a reduction in spherulite size is achieved. The heterogeneous nucleation additives include high surface area silica, carbon black, phthalocyanine green and phthalocyanine blue pigments. These additives are used in amounts of from about 2.5 ppm to about 2000 ppm.

(3) Blown Film Extrusion

The films herein may be extruded by tubular blown film extrusion. In this process a molten, narrow molecular weight distribution ethylene hydrocarbon copolymer is extruded through an annular die having a die gap of greater than about 50 mils to less than about 120 mils, preferably greater than about 50 mils to less than about 100 mils. The copolymer is extruded at a temperature of about 325° to about 500° F., and is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion of the tubular film. The degree of expansion, as measured by the ratio of the fully expanded tube circumference to the circumference of the die anulus, is in the range 1/1 to 6/1 and preferably, 1/1 to 4/1. The tubular extrudate is cooled by conventional techniques such as, by air cooling, water quench or mandrel.

The drawdown characteristics of the ethylene hydrocarbon copolymers herein are excellent. Drawdown, defined as the ratio of the die gap to the product of film gauge and blow up ratio, is kept greater than about 2 to less than about 250 and preferably greater about 25 to less than about 150. Very thin gauge films can be produced at high drawdown from these ethylene hydrocarbon copolymers even when said copolymer is highly contaminated with foreign particles and/or gel. Thin gauge films greater than about 0.5 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end use characteristic of certain types of film and is not well understood from a fundamentals perspective.

As the ethylene hydrocarbon copolymer exits the annular die, the extrudate cools and its temperature falls below its melting point and it solidifies. The optical properties of the extrudate change as crystallization occurs and a frost line is formed. The position of this frost line above the annular die is a measure of the cooling rate of the copolymer film. This cooling rate has a very marked effect on the optical properties of the ethylene hydrocarbon copolymer film produced herein.

Crystallization effects, as discussed previously, dominate the optical properties of the ethylene hydrocarbon copolymer films described herein. Blown film process parameters have a very pronounced effect on the optical properties of these films. A blown film operating methodology has been developed to control film optical properties of the ethylene hydrocarbon copolymers employed in the present invention. The 45° specular gloss of these blown films may be controlled by operating the film extrusion process according to the following relationship:

$$45° \text{ specular gloss} = 336.4 \, \phi^{-0.664}$$

$\phi$ is a cooling rate parameter $$\phi = \tau \, (MI)^{0.29}[(Tm - Tc)/Tm]^{-1}$$

where
Tc = resin crystallization temp. (°K.)
Tm = compound temp. (°K.)
MI = resin melt index (grams/10 min.)
$\tau$ = residence time of extrudate between the die and the frost line (sec.)

$\tau$ is calculated assuming, that to a first approximation, extrudate extension between the die and the frost line height is a constant strain rate deformation.

$$\tau = \frac{FLH}{V_1 - V_0} \ln \frac{V_1}{V_0}$$

where
FLH = frost line height (cm.)
$V_1$ = linear nip roll velocity (cm/sec)
$V_0$ = average linear extrudate velocity at the die exit (cm/sec)

$V_o$ is calculated as below:

$$V_o = Q/\rho_m \pi DG$$

where
Q = extruder output rate (grams/sec)
$\rho_m$ = melt density (grams/cm$^3$)
D = die diameter (cm)
G = die gap (cm)

Figure 5:
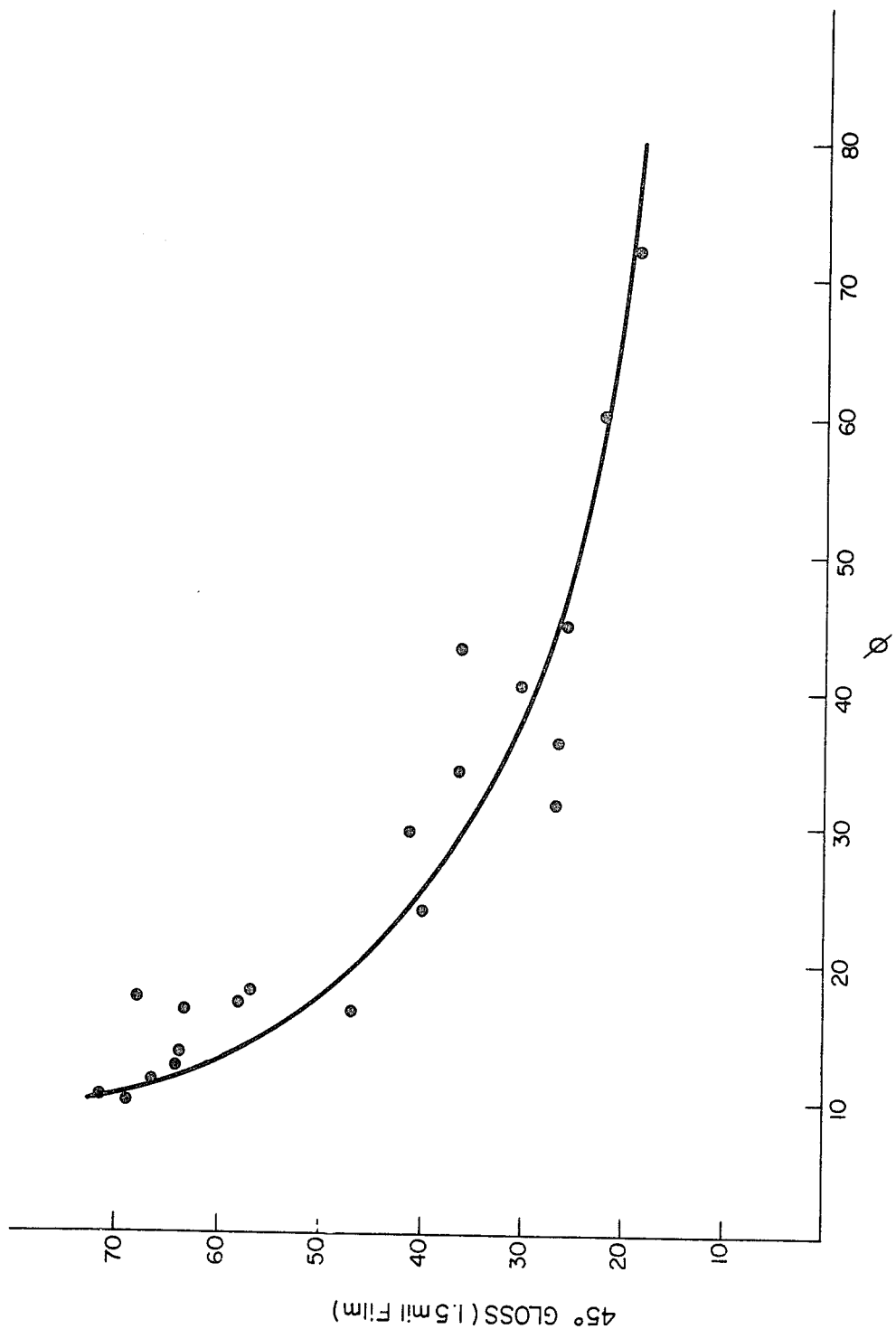
FIG. 5 shows the 45° specular gloss as a function of the parameter $\phi$, a cooling rate parameter.
Figure 6:
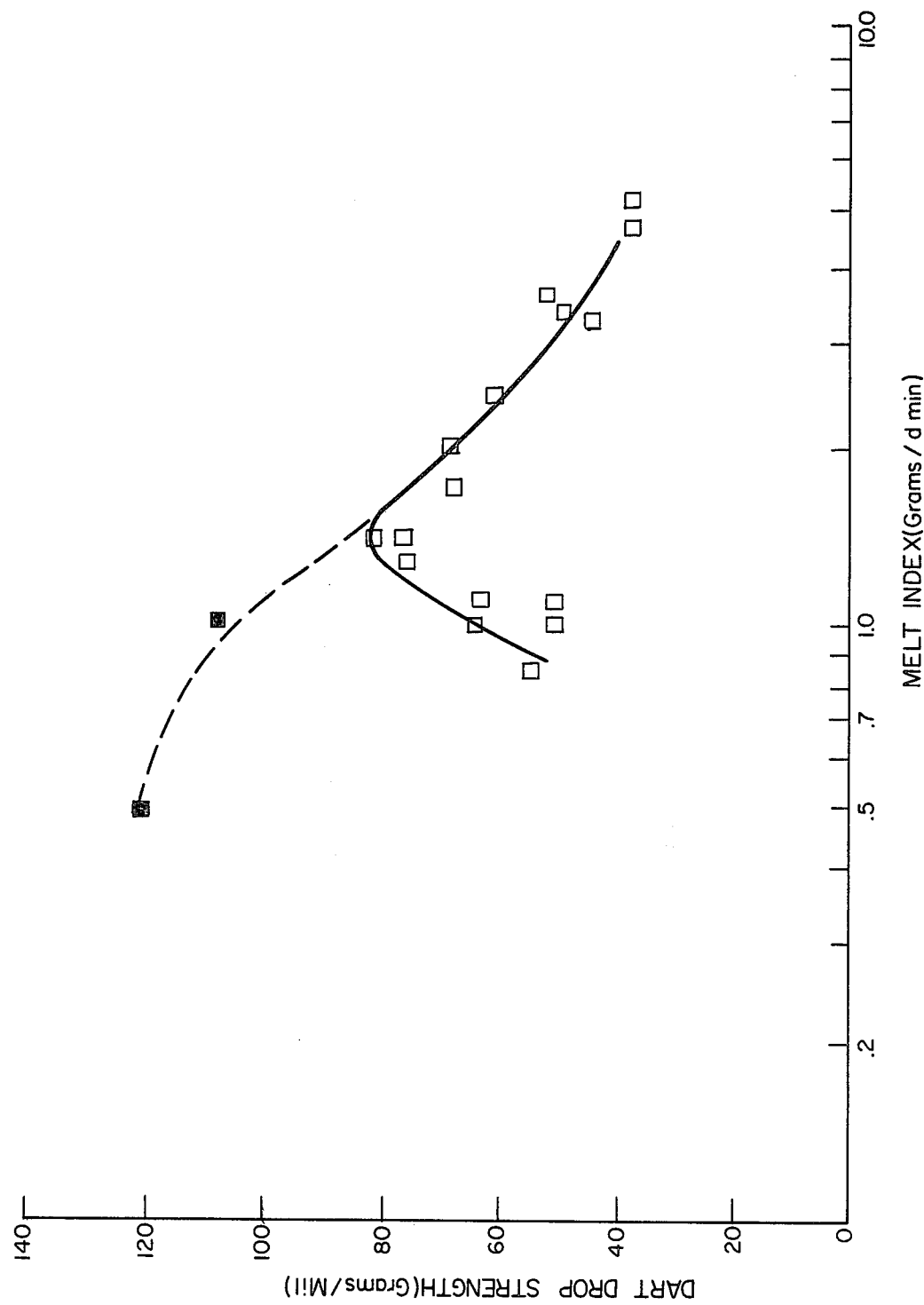
FIG. 6 shows dart drop data plotted versus resin melt index.

The 45° specular gloss as a function of the parameter $\phi$ is given in FIG. 5. The data was obtained for ethylene hydrocarbon copolymers over a melt index range of 0.5 to 3.1 gms/10 min for film of 1.5 mil thickness produced with a blow up ratio of 2:1.

The solid line in FIG. 5 is represented by 45° specular glass = $336\phi^{-0.66}$. As demonstrated in FIG. 5, the 45° specular gloss can be adjusted according to a parameter $\phi$, by regulating the temperature and/or velocity of the air used to cool the bubble and thereby control the cooling rate of extrudate.

The ethylene hydrocarbon copolymers, as described herein, exhibit low melt strength during tubular blown film extrusion. This may cause "bubble stability" problems if the resin is high melt index or if extrusion compound temperatures are too high. It has been found that the addition of small quantities, from about 1 wt. % to about 20 wt. % of high pressure low density polyethylene of melt index from about 0.1 to about 6.0 grams/10 min., to the ethylene hydrocarbon copolymers significantly enchance "bubble stability" and thus allows higher output rates. "Bubble stability" is defined as the qualitative operational stability of the extrudate during tubular blown film extrusion. Poor bubble stability is characterized by bubble "chatter" caused by the flow of the turbulent air directed at the tube by the air ring in order to cool the extrudate and control the frost line height. The high pressure low density polyethylene addition can occur in a separate hot compounding step prior to film extrusion or may be accomplished by simply dryblending these high pressure resins with the ethylene hydrocarbon copolymer as it enters the hopper of the film extruder. The high pressure low density polyethylene resins may also serve as masterbatch carriers for common film additives, for example, slip agents, anti-block compounds, colorants, antioxidants, stabilizers, fillers, nucleating agents, etc. These high pressure low density polyethylene additives often perform the additional function of improving film optical and mechanical properties. The preferred high pressure low density polyethylene melt index range is about 0.2 to about 5.0. The preferred additive level of high pressure low density polyethylene is about 2 to about 12 wt. percent.

(4) Slot Cast Film Extrusion

This film extrusion method is well known in the art and comprises extruding a sheet of molten polymer through a slot die and then quenching the extrudate using, for example, a chilled casting roll or water bath. In the chill roll process, film may be extruded horizontally and layed on top of the chill roll or it may be extruded downward and drawn under the chill roll. Extrudate cooling rates in the slot cast process are very high. Chill roll or water bath quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate, than practiced in the blown film process. The higher temperatures reduce shear stresses in the die and raise the output threshold for melt fracture.

In the slot cast film extrusion process, drawdown is defined as the ratio of die gap to film gauge. The distance between the extrusion die lips and the point at which the extrudate solidifies is called the draw span. This distance defines the length over which drawdown i.e., extensional deformation takes place. The draw span controls the strain rate of the extensional deformation. At short draw spans, strain rate is high. At long draw spans strain rate is low. The draw span is where molecular orientation is developed.

In the slot cast film extrusion of high pressure low density polyethylene, the strain hardening character of the high pressure low density polyethylene melt causes much molecular orientation to be developed in the film when extruded at high drawdown. Slot cast, high pressure low density polyethylene films can exhibit highly imbalanced mechanical properties. The narrow molecular weight distribution ethylene hydrocarbon copolymers employed in this invention, as discussed previously, exhibit reduced strain hardening behavior in the melt. As in the blown film process, these materials may be extruded at high drawdown, without the building in of excessive molecular orientation. The mechanical property balance of these films does not change significantly as drawdown is increased.

(5) Extrusion Coating

The ethylene hydrocarbon copolymers, as described herein, may be extruded directly on a variety of substrates to form composite sheets by methods which are well known in the art. The substrates include materials such as polyethylene, paper, aluminum foil, etc. The coating equipment may include a single extrusion line or more than one extrusion line in order to apply multiple layers or laminate multiple layers of substrates together.

(6) Properties of Copolymers and Film

The properties of the ethylene hydrocarbon copolymers and films produced therefrom, were determined by the following methods:

Density: ASTM D-1505—Plaque is conditioned for one hour at 100° C. to approach equilibrium crystallinity—reported as gms/cm$^3$.

Melt Index (MI): ASTM D-1238—Condition E—measured at 190° C.—reported as grams per 10 minutes.

Flow Index (HLMI): ASTM D-1238—Condition F measured at 10 times the weight used in the melt index test above—reported as grams per 10 minutes.

Melt Flow Ratio (MFR): Flow Index/Melt Index.

Molecular Weight Distribution Mw/Mn: Gel Permeation Chromatography Styragel column packing, pore size packing sequence is 10$^7$, 10$^5$, 10$^4$, 10$^3$, 60 A°; solvent: Perchloroethylene at 117° C. Detection: Infrared at 3.45 m.

Unsaturation: Infrared Spectrophotometer (Perkin Elmer Model 21). Pressings 25 mils in thickness are used. Absorbance is measured at 10.35$\mu$ for trans vinylene, 11.0$\mu$ for terminal vinyl and 11.25$\mu$ for pendant vinylidene. The absorbance per mil at each wavelength is directly proportional to the product of unsaturation concentration and absorbtivity. Absorbtivities were taken from the literature values of de-Kock, R. J. and Hol, P., A., H., M., J. Poly. Sci. Part B, 2, 339 (1964).

TEA Volatiles: This measurement, made with the DuPont model 916 Thermal Evolution Analyzer (TEA) determines the fraction of species present in a sample of less than approximately 500 molecular weight. A 5 mg sample is heated under nitrogen at 32° C./min. up to 300° C. and held isothermally for 20 min. As the sample heats, evolved gases are swept by nitrogen to a flame ionization detector. Calibration with $C_{20}$ standards permits translation of instrument output into volatile weight. Normalizing by sample weight and multiplying by 100 gives weight percent volatiles.

Film Haze: ASTM D-1003-61—Percentage of transmitted light scattered more than 2.5° from the normal incident beam. Reported as percent haze.

45° Specular Gloss: ASTM D-2457-70. Gloss measurements were made using a Gardner Model UX-6 glossmeter. 45° specular gloss is the relative luminous fractional reflectance of a film specimen where the incident beam is 45° off the normal and, the receptor is at the mirror reflection of the axis of the incident beam.

60° Specular Gloss: ASTM D-2457-70. Gloss measurements were made using a Gardner model UX-6 glossmeter. 60° specular gloss (polished) is the relative luminous fractional reflectance of a film specimen, where the incident beam is 60° off the normal and, the receptor is at the mirror reflection of the axis of the incident beam.

Puncture Resistance: A film of measured thickness is supported on 3.25 inch diameter ring which, in turn, is mounted on an Instron tensile testing machine. A blunt ended plunger having a 0.75 inch diameter, hemispherical head is pressed through the ring of supported film at a rate of 20 in./min. The energy required to deform the film to rupture is normalized by film thickness and reported as in.-lbs./mil. ASTM D-1922. This is a notched tear test.

Elmendorf Tear Strength: A $2\frac{1}{2}$ in. $\times 3\frac{1}{2}$ in. film specimen is subjected to a "pant leg" type tear. This is a pendulum impulse type test. It measures the force required to propagate a tear. The tear strength is measured in grams. The data presented herein have been normalized by film thickness and reported as grams/mil.

Tensile Strength and Elongation: ASTM D-882. Film strips, 1 in.$\times$5 in. are clamped at a 2 inch gauge length and deformed at a jaw separation rate of 20 in./min. Tensile strength is the engineering stress developed at break. Elongation at break is measured by following the deformation of 1 in. gauge marks placed on the film sample and is reported in percent.

Tensile Impact Strength: This test is a pendulum impact test. It uses test specimens of ASTM test procedure D 1822. Layers of film are stacked in order to achieve a minimum specimen thickness of 15 mils. This puts failure energy within a measurable range. The pendulum impact energy is normalized by sample volume and reported as ft.-lbs./in$^3$.

Secant Modulus: ASTM D-882. Film strips, 10 in.$\times$0.5 in. are clamped at a 5 inch gauge length and deformed at a jaw separation rate of 0.5 in./min. A force elongation trace is determined. Secant modulus is the slope of a line drawn from the origin to the load at 1% deformation. Deformation is determined by crosshead position. Normalizing by the specimen's undeformed cross-sectional area, secant modulus is reported in psi.

Film Rating: A sample of film is viewed with the naked eye to note the size and distribution of gels or other foreign particles in comparison to standard film samples. The appearance of the film as thus compared to standards is then given a rating on a scale of $-100$ (very poor) to $+100$ (excellent).

Crystallization Temp., Tc: Perkin Elmer Model DSC-2 Differential Scanning Calorimeter. Specimens 10-12 mils in thickness were heated to 150° C. under nitrogen and held isothermally for 3 minutes. Specimens were then cooled at 10° C./min. The crystallization temperature represents the temperature at which the resin begins to exhibit a crystallization exotherm Dart drop Impact Strength: ASTM-1709 a single layer of film is supported on a 5 inch diameter ring clamp. A dart with a hemispherical head of $1\frac{1}{2}$ inch diameter is dropped from a height of 26 inches. Film failure is recorded when a true break is observed as a result of dart penetration. Weights are added or removed in 15 gram increments in order to statistically record the failure weight. The test involves 30 repetitions. The failure weight represents the dart weight at which 50 percent of the film spans fail. For purposes of the examples reported herein, the failure weight has been normalized by film gauge and reported as grams/mil.

Melt Fracture: As described, supra, melt fracture refers to the phenomenon in which a resin extrudate becomes rough and non-uniform due to melt instabilities during polymer flow. These surface distortions can be "frozen" in a polymer film and detected with the naked eye. A film is characterized as melt fractured based on the visual observation of these surface irregularities.

Bulk density: The resin is poured via $\frac{3}{8}$ inches diameter funnel into a 100 ml graduated cyclinder to 100 ml line without shaking the cylinder, and weighed by difference.

The following Examples are designed to illustrate the process of the present invention and are not intended as a limitation upon the scope thereof.

EXAMPLES

I. Preparation of Precursor Composition

In a 5 liter flask equipped with a mechanical stirrer, 16.0 g (0.168 Mol) of anhydrous $MgCl_2$ was mixed with 850 ml of pure tetrahydrofuran under nitrogen. The mixture was stirred at room temperature ($\sim 25°$ C.) while 13.05 g (0.069 Mol) of $TiCl_4$ was added dropwise. After complete addition, the contents of the flask were heated to reflux for about $\frac{1}{2}$ to 1 hour to dissolve the solids. The system was cooled to room temperature and 3 liters of pure n-hexane was slowly added over a period of $\frac{1}{4}$ hour. A yellow solid precipitated. The supernatant was decanted and the solids were washed with $3\times$ one liter of n-hexane. The solids were filtered and dried in a rotating evaporating flask at 40°-60° C. to give 55 g of solid precursor composition.

The precursor composition may be analyzed at this point for Mg and Ti content since some of the Mg and-/or Ti compound may have been lost during the isolation of the precursor composition. The empirical formulas used herein in reporting these precursor compositions are derived by assuming that the Mg and the Ti still exist in the form of the compounds in which they were first added to the electron donor compound and that all other residual weight in the precursor composition is due to the electron donor compound.

Analysis of the solid showed the following: Mg:6.1%; Ti:4.9%; which corresponds to $TiMg_{2.45}Cl_{8.9}(THF)_{7.0}$. THF means tetrahydrofuran.

II. Activation Procedures

Procedure A.—This procedure relates to a multi-step activation of the precursor composition. In this procedure the activation is conducted in such a way that the precursor composition is only partially reduced prior to the introduction thereof into the polymerization reactor, and then the remainder of the reduction process is completed within such reactor.

The desired weight of dry inert carrier material is charged to a mixing vessel or tank. For the examples described herein the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having an elemental titanium content of $1 \pm 0.1$ millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of $>0$ to $<10:1$ and preferably of 4 to 8:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure in an inert atmosphere.

The resulting slurry is then dried under a purge of dry inert gas such as nitrogen or argon, at atmospheric pressure at a temperature of 60° C. to remove the hydrocarbon diluent. This process usually requires about 3 to 5 hours. The resulting product is in the form of a dry free-flowing particulate material wherein the activated precursor composition is uniformly blended with the inert carrier. The dried non-pyrophoric product is stored under an inert gas.

Where additional activator compound is fed to the polymerization reactor in this Procedure A for the purposes of completing the activation of the precursor composition, it may be first absorbed on an inert carrier material such as silica or polyethylene, or, most preferably, it may be injected into the reaction zone as a dilute solution in a hydrocarbon solvent such as isopentane.

Where the activator compound is to be absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of $65° \pm 10°$ C. to remove the hydrocarbon diluent.

Where the activator compound is to be injected into the polymerization reaction system as a dilute solution, concentrations of about 5 to 10% by weight are preferred.

Regardless of the method used to introduce the activator compound into the polymerization reactor for the purposes of completing the activation of the precursor composition, it is added at a rate such as to maintain the Al/Ti ratio in the polymerization reactor at a level of $\geq 10$ to 400:1 and preferably of $\geq 10$ to 100:1.

Prior to being used herein, the silicas are dried at $\geq 200°$ C. for $\geq 4$ hours.

Procedure B—In this procedure a complete activation of the precursor composition is accomplished by blending the precursor composition with, and thereby contacting it with, the activator compound which is absorbed on an inert carrier material.

The activator compound is absorbed on the inert carrier material by being slurried with the carrier material in an inert hydrocarbon solvent and by then drying the slurry to remove the solvent so as to provide a composition containing about 10 to 50 weight percent of activator compound. Thus, 500 grams of silica which has been previously dehydrated (at 800° C. for 4 hours) is charged to a mixing vessel. The desired amount of activator compound, as a 20 weight percent solution in hydrocarbon solvent, such as hexane, is then added to the mixing vessel and mixed (slurried) with the inert carrier at room temperature and atmospheric pressure. The solvent is then removed by drying the resulting slurry at $65° \pm 10°$ C. for about 3 to 5 hours at atmospheric pressure under a flowing stream of dry inert gas such as nitrogen. The dried composition is in the form of free flowing particles having the size of the carrier material.

About 500 grams of the dried silica supported activator compound (50/50 weight percent of silica/activator compound) is then added to a mixing vessel. The desired weight of precursor composition (80–100 grams) is also added to the mixing vessel. The materials are then thoroughly mixed for about 1 to 3 hours at room temperature at atmospheric pressure under a dry inert gas such as nitrogen or argon. The resulting composition is in the form of a physical admixture of dry free-flowing particles having a size of the order of 10 to 150 microns. During the admixing operation the supported activator compound comes into contact with the precursor composition and completely activates it. During the resulting exothermic reaction the temperature of the catalyst composition should not be allowed to exceed 50° C. so as to avoid any significant deactivation of the catalyst. The resulting activated composition has an Al/Ti ratio of about 10 to 50 and may be pyrophoric where it contains $>10$ weight percent of the activator compound. It is stored under a dry inert gas such as nitrogen or argon prior to being injected into the reactor.

EXAMPLE 1

Ethylene was copolymerized with propylene or butene-1 (propylene in Runs 1 and 2 and butene-1 in Runs 3 to 14) in each of this series with catalyst formed as described above and as activated by Activation Procedure A to produce polymers having a density of $\leq 0.940$. In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Runs 1 to 3 and 4 to 14, and adsorbed on silica, 50/50 weight %, in Runs 4 and 5 so as to provide the completely activated catalyst in the reactor with an Al/Ti mol ratio of about 29 to 140.

Each of the polymerization reactions was continuously conducted for >1 hour after equilibrium was reached and under a pressure of about 300 psig and a gas velocity of about 5 to 6 times $G_{mf}$ in a fluid bed reactor system at a space time yield of about 3 to 6 lbs/hr/ft$^3$ of bed space. The reaction system was as described in the drawing above. It has a lower section 10 feet high and 13½ inches in (inner) diameter, and an upper section which was 16 feet high and 23½ inches in (inner) diameter.

In several of the Runs zinc diethyl was added during the reaction (as a 2.6 weight % solution in isopentane) to maintain a constant Zn/Ti mol ratio where the zinc diethyl was used, the triethyl aluminum was also added as a 2.6 weight % solution in isopentane.

Table A below lists, with respect to Runs 1 to 14

TABLE B

Properties of Polymers Made in Runs 1 to 14

| Run No | Density | M.I. | MFR | bulk density | average particle size,inches |
|---|---|---|---|---|---|
| 1 | 0.927 | 22.0 | 24.4 | 16.8 | 0.0230 |
| 2 | 0.929 | 24.0 | 23.4 | 17.5 | 0.230 |
| 3 | 0.925 | 0.61 | 27.1 | 16.8 | 0.0300 |
| 4 | 0.931 | 12.0 | 26.7 | 16.8 | 0.0275 |
| 5 | 0.923 | 1.47 | 28.2 | 15.6 | 0.0404 |
| 6 | 0.919 | 3.41 | 25.9 | 16.8 | 0.0550 |
| 7 | 0.925 | 2.90 | 24.5 | 17.5 | 0.0590 |
| 8 | 0.919 | 3.10 | 24.6 | 16.2 | 0.0570 |
| 9 | 0.929 | 16.0 | 24.1 | 17.3 | 0.0230 |
| 10 | 0.929 | 15.3 | 24.0 | 16.6 | 0.0234 |
| 11 | 0.928 | 11.5 | 24.1 | 16.7 | 0.0248 |
| 12 | 0.929 | 20.7 | 24.3 | 17.3 | 0.0258 |
| 13 | 0.929 | 29.2 | 26.1 | 16.8 | 0.0206 |

EXAMPLES 2 TO 9

An ethylene-butene-1 copolymer (Examples 2-3) prepared as in Example 1 and prior art ethylene-butene-1 copolymers (Examples 4 to 7), and a high pressure low density polyethylene (Union Carbide DYNH), Examples 8 and 9, have the following properties:

| Examples | Resin | Melt Index (g/10 min) | MFR | Density (g/cm$^3$) | $\overline{Mn}(\times 10^{-3})$ | $\overline{Mw}/\overline{Mn}$ | TEA Volatiles (Wt. %) | Total Unsaturation (C=C/1000C atoms) |
|---|---|---|---|---|---|---|---|---|
| 2-3 | Ethylene-butene-1 copolymer | 1.7 | 26 | 0.920 | 33.2 | 3.0 | 0.07 | 0.1892 |
| 4-5 | Prior art ethylene-butene-1 copolymer | 0.9 | 65 | 0.919 | 16.3 | 5.5 | 0.52 | 1.2632 |
| 6-7 | Prior art ethylene-butene-1 copolymer | 1.3 | 39 | 0.922 | 27.7 | 4.8 | 0.20 | 0.5126 |
| 8-9 | High Pressure low density polyethylene | 2.4 | 50 | 0.918 | 31.2 | 15.6 | 0.21 | — | various operating conditions employed in such examples i.e., the weight % of precursor composition in the blend of silica and precursor composition; Al/Ti ratio in the partially activated precursor composition; Al/Ti ratio maintained in the reactor; polymerization temperature; % by volume of ethylene in reactor; H$_2$/ethylene mol ratio; comonomer (C$_x$)/C$_2$ mol ratio in reactor; catalyst productivity and Zn/Ti mol ratio. Table B below lists properties of the granular virgin resins made in runs 1 to 14, i.e., density; melt index (M.I.); melt flow ratio (MFR); weight % ash; Ti content (ppm), bulk density and average particle size.

These resins were formed into film of 1.5 mil gauge, by blown film extrusion using a 2½ inch diameter, 24:1 length to diameter extruder. A polyethylene screw fitted with a Maddock mixing head was used. The mixing section was a fluted mixing section with the following characteristics: a diameter of 2.5 inches; 3.0 inch channels; channel radius of 0.541 inches; mixing barrier land width of 0.25 inches; cleaning barrier land width of 0.20 inches; and a mixing barrier length of 4.5 inches. Also, a 20/60/20 mesh screen pack and a six inch diameter, spiral pin, blown film extrusion die were used. The die temperature was set at 400°–430° F. Output rate was 70 lbs/hour. Nip roll height was approximately 15 ft.

TABLE A

Reaction Conditions For Runs 1 to 14

| Run No | Weight % precursor | Al/Ti ratio in part. act precursor | Al/Ti ratio in reactor | Temp °C. | Vol % C$_2$ | H$_2$/C$_2$ mol ratio | C$_x$/C$_2$ mol ratio |
|---|---|---|---|---|---|---|---|
| 1 | 8.3 | 5.8 | 40.5 | 90 | 41.7 | 0.492 | 0.486 |
| 2 | 8.3 | 5.8 | 50.8 | 90 | 39.7 | 0.566 | 0.534 |
| 3 | 20.1 | 4.50 | 88.3 | 85 | 56.3 | 0.148 | 0.450 |
| 4 | 19.8 | 4.40 | 26.7 | 85 | 50.2 | 0.350 | 0.350 |
| 5 | 19.8 | 4.40 | 26.7 | 80 | 54.1 | 0.157 | 0.407 |
| 6 | 6.9 | 5.08 | 42.0 | 85 | 49.2 | 0.209 | 0.480 |
| 7 | 6.9 | 5.08 | 33.6 | 85 | 46.5 | 0.208 | 0.482 |
| 8 | 6.9 | 5.08 | 28.8 | 85 | 42.1 | 0.206 | 0.515 |
| 9 | 8.3 | 5.8 | 124.6 | 90 | 45.1 | 0.456 | 0.390 |
| 10 | 8.3 | 5.8 | 80.8 | 90 | 42.7 | 0.365 | 0.396 |
| 11 | 8.3 | 5.8 | 52.0 | 90 | 48.4 | 0.350 | 0.397 |
| 12 | 8.3 | 5.8 | 140.1 | 90 | 42.6 | 0.518 | 0.393 |
| 13 | 8.3 | 5.8 | 63.5 | 90 | 40.8 | 0.556 | 0.391 |

Cooling was accomplished with a Venturi type air ring. All films were prepared at a 2:1 blow up ratio (ratio of bubble circumference to die circumference, hereinafter BUR).

The die gap of the extrusion die, the compound temperature and the pressure at the mixing head are as set forth in Table I. The following properties of the produced film were measured: Puncture resistance, Elmendorf tear, Tensile strength, Elongation, Yield strength, Tensile impact and melt fracture and are as set forth in Table I.

shows this same trend. MD ultimate elongation, however, is shown to decrease while TD elongation increases. The ethylene-butene-1 copolymers exhibit the opposite behavior. The prior art copolymers (Examples 4–7) show very low MD Elmendorf tear strengths. The prior art ethylene butene-1 copolymer films are also perceived as "splitty" in the MD direction. Wide die gap extrusion further aggravates this problem. TD tear strengths are observed to increase with increasing drawdown. The narrow molecular weight distribution ethylene-butene-1 copolymer of Examples 2 and 3 is

TABLE I

| Example | Die gap (mils) | Compound Temp. (°F.) | Pressure at Mixing Head (psig) | Puncture Resistance (lbs/mil) | Elmendorf Tear (gms./mil) MD | TD | Tensile Strength (psi) MD | TD | Elongation (%) MD | TD | Yield Strength (psi) MD | TD | Tensile Impact (ft./lbs/in³) MD | TD | Melt Fracture |
|---|---|---|---|---|---|---|---|---|---|---|---|---|---|---|---|
| 2 | 30 | 455 | 4525 | 15.8 | 96 | 259 | 4160 | 3410 | 638 | 710 | 1520 | 1500 | 798 | 1251 | yes |
| 3 | 61 | 435 | 3250 | 15.6 | 89 | 326 | 4970 | 3770 | 632 | 754 | 1640 | 1720 | 458 | 485 | no |
| 4 | 30 | 440 | 4850 | 11.8 | 23 | 390 | 4240 | 3190 | 518 | 720 | 2330 | 1450 | 510 | 537 | no |
| 5 | 61 | 440 | 3450 | 11.8 | 20 | 554 | 3910 | 3010 | 478 | 696 | 2350 | 1500 | 538 | 409 | no |
| 6 | 30 | 472 | 5100 | 6.3 | 52 | 356 | 5010 | 3280 | 540 | 660 | 1900 | 2060 | 1083 | 1305 | slight |
| 7 | 61 | 455 | 4350 | 7.7 | 38 | 451 | 5600 | 3290 | 496 | 666 | 1560 | 1560 | 722 | 828 | slight |
| 8 | 30 | 412 | 1750 | 9.2 | 171 | 106 | 3370 | 2720 | 368 | 584 | 1280 | 1280 | 484 | 513 | no |
| 9 | 61 | 412 | 1350 | 10.7 | 329 | 76 | 3900 | 2670 | 220 | 602 | 1290 | 1290 | 481 | 574 | no |

Table I compares the wide die gap extrusion performance of three ethylene-butene-1 copolymers of 1.7 melt index, 0.920 density; 0.9 melt index, 0.919 density; and 1.3 melt index, 0.922 density (Examples 2 to 7) with a long chain branched, high pressure, tubular reactor low density polyethylene resin of 2.4 melt index, 0.918 density (Examples 8 and 9). Increasing die gap from 30 to 61 mils reduced head pressure 1275 psi for the narrow molecular weight distribution ethylene butene-1 copolymers (Examples 2 and 3) while only 400 psi for the high pressure low density polyethylene control resin (Examples 8 and 9). Opening die gap at constant melt temperature and output rate results in reduced shear stresses in the extrusion die. For the extrusion conditions employed here, increasing die gap from 30 to 61 mils elminated melt fracture for Examples 2 and 3. Stated another way, the output rate threshold for melt fracture is raised by practicing wide die gap film extrusion.

A key element of the present invention is illustrated by the film property data of Table I. At fixed film gauge and blow up ratio, wide die gap film extrusion means drawdown essentially doubles from 10 to 20 as die gap increases from 30 to 61 mils. This increased drawdown has a very pronounced effect on the mechanical properties of the high pressure low density polyethylene film (Examples 8 and 9). MD Elmendorf tear strength increases while TD strength decreases. Tensile strength unique in that MD Elmendorf tear strength remains at a respectable level even when extruded through a wide die gap. It is not "splitty". Tensile strength for this resin increased in both the MD and TD direction with increased drawdown. MD Elongation showed little response to increased drawdown. (it exceeded 630% at 61 mil die gap). TD elongation increased. Puncture resistance for these films was exceptional.

EXAMPLES 10 TO 18

Ethylene-butene-1 copolymers (Examples 10 to 17) prepared as in Example 1 and a commercially available high pressure low density polyethylene resin (Union Carbide DFDA-0154), Example 18, have the following properties:

| Example | Resin | Melt Index (g/10 min) | MFR | Density (g/cm³) | $\overline{Mn}$ (× 10⁻³) | $\overline{Mw}/\overline{Mn}$ | TEA Volatiles (wt. %) | Total Unsaturation C=C/1000C atoms |
|---|---|---|---|---|---|---|---|---|
| 10–11 | Ethylene-butene-1 copolymer | 4.7 | 26.1 | 0.923 | 24.8 | 3.3 | 0.07 | — |
| 12–15 | Ethylene-butene-1 copolymer | 3.6 | 24.8 | 0.922 | 27.5 | 3.1 | 0.06 | 0.1826 |
| 16–17 | Ethylene-butene-1 copolymer | 3.0 | 25.2 | 0.920 | 28.0 | 3.1 | 0.10 | — |
| 18 | High Pressure Low Density Polyethylene | 4.7 | 65 | 0.922 | — | — | — | — |

These resins were formed into film of gauge as in Table II, using a 1½ inch diameter, 18:1, L/D extruder fitted with a three inch, spiral pin, blown film extrusion die. Die gap was set at 50 mils. The screen pack measured 20/60/20 mesh. Output rate was approximately 27 lbs/hr. A 3:1 blow up ratio (BUR) was used in Examples 10 to 17, while a 2:1 BUR was used in Example 18. The compound temperatures are as set forth in Table II. The film gauge and drawdown as well as the following properties of the film: Film rating, Haze, 45° gloss, Puncture resistance, Elmendorf tear, Tensile strength, Elongation, Tensile impact and Secant modulus, are as set forth in Table II.

TABLE II

| Example | Compound Temp (°F.) | Film Gauge (mils) | Draw-down | Film Rating | Haze (%) | 45° Gloss | Puncture Resistance (in-lbs/mil) | Elmendorf Tear (gms/mil) | | Tensile Strength (psi) | | Elongation (%) | | Tensile Impact (ft-lbs/in³) | | Secant Modulus (psi) | |
|---|---|---|---|---|---|---|---|---|---|---|---|---|---|---|---|---|---|
| | | | | | | | | MD | TD | MD | TD | MD | TD | MD | TD | MD | TD |
| 10 | 380 | 0.2 | 83 | −50 | 8.0 | 54 | 15.2 | 36 | 571 | 4540 | 2660 | 420 | 496 | 886 | 164 | 27700 | 29500 |
| 11 | 380 | 0.5 | 33 | −50 | 8.6 | 52 | 12.4 | 75 | 300 | 3140 | 2350 | 562 | 628 | 836 | 226 | 30900 | 27900 |
| 12 | 380 | 0.2 | 83 | −50 | 8.5 | 49 | 16.0 | 48 | 511 | 7680 | 1570 | 302 | 440 | 1105 | — | 23600 | 29200 |
| 13 | 380 | 1.5 | 11 | −50 | 10.9 | 60 | 13.0 | 82 | 230 | 3200 | 2660 | 708 | 652 | 900 | 336 | 30000 | 36300 |
| 14 | 380 | 0.5 | 33 | −50 | 11.0 | 46 | 13.2 | 95 | 390 | 3630 | 2810 | 528 | 674 | 1136 | 325 | 31200 | 39200 |
| 15 | 380 | 0.35 | 67 | −50 | 7.3 | 49 | 14.3 | 50 | 550 | 4550 | 2450 | 376 | 600 | 1191 | 431 | 25600 | 35400 |
| 16 | 380 | 1.5 | 11 | −50 | 10.1 | 60 | 10.0 | 151 | 203 | 3090 | 2800 | 674 | 700 | 1555 | — | 26400 | 28200 |
| 17 | 380 | 0.5 | 33 | −50 | 11.0 | 42 | 15.5 | 105 | 375 | 4030 | 2590 | 552 | 606 | 1300 | 450 | 28000 | 31400 |
| 18 | 385 | 0.5 | 50 | +50 | 5.4 | 64 | 2.3 | 363 | 104 | 4830 | 1800 | 116 | 405 | 477 | 304 | 32900 | 43800 |

The data of Table II illustrate that films of very thin gauge can be easily prepared from the ethylene hydrocarbon copolymers employed in the present invention.

These ethylene hydrocarbon copolymers can sustain very high extensional deformations without the extrudate fracturing. Films of very thin gauge were extruded from highly contaminated resin (−50 film rating). The blown film extrusion of these films was trouble free. Blow holes were not initiated by gels.

Furthermore, these films retain attractive properties. Puncture resistance values are very high. Ultimate elongation values remain in excess of 300% even at very high drawdowns. The higher melt index ethylene hydrocarbon copolymers retain even larger elongations at these high drawdowns. Tensile impact strengths for these materials exceed those of high pressure low density polyethylene. Elmendorf tear strength decreases in the MD direction while increasing in the TD direction as drawdown is raised. Measuring Elmendorf tear strength of very thin gauge film is difficult. It should be noted that even the very thinnest gauge film was not perceived as "splitty".

The unique strain softening extensional rheology of the ethylene hydrocarbon copolymers employed in this invention permits very thin gauge films to be prepared at very high drawdown. The highest drawdown film starts to develop fairly high levels of orientation and exhibits unbalanced film properties but, in general, the minor direction property remains at a level, high enough, such that the thin film still retains overall commercial utility.

EXAMPLES 19 TO 25

An ethylene-butene-1 copolymer prepared as in Example 1, having a melt index of 2.0 and a density of 0.922 was blended with each of two commercially available high pressure low density polyethylene resins Resin A (Union Carbide DYNH, melt index 2.4, density 0.918) and Resin B (Union Carbide DYNK, melt index 0.2, density 0.920) in a Banbury mixer at about 140° C.

The blended resins were extruded into film of 1.5 mil gauge using a 1½ inch diameter, 18/1 L/D extruder fitted with a three inch diameter, spiral pin, blown film extrusion die. Die gap was set at 50 mils. The screen pack measured 20/60/20 mesh. Output rate was approximately 18 lbs/hr. A 2:1 blow up ratio was used. Frost line height was maintained at approximately 7-9 inches.

The high pressure low density polyethylene resin and its concentration are as set forth in Table III. The following properties of the film were measured: Haze, 45° gloss, Puncture resistance, Elmendorf tear, Tensile strength, Elongation, Tensile Impact and Secant Modulus are as set forth in Table III.

As discussed previously, strain softening polymeric melts are perceived as having low melt strength. This, in turn, may lead to poor "bubble stability" in the tubular blown film extrusion process if temperatures are too high or if resin melt index is too high. The addition of small amounts of high pressure low density polyethylene (which strain hardens during melt extrusion) can enhance "bubble stability" and furthermore lead to film with an improved balance of properties.

Example 19 shows the property profile of an unmodified, i.e., no additives, narrow molecular weight distribution, ethylene-butene-1 copolymer film of 2.0 melt index, 0.922 density. Examples 19 to 24 illustrate the effect on film properties of adding 1-20 wt. % of a 2.4 melt index, 0.918 density high pressure, long chain branched, low density polyethylene resin. Examples 25 to 28 show the effect on film properties of adding 1-20 wt. % of at 0.2 melt index, 0.920 density high pressure, long chain branched resin.

It is observed that the addition of minor amounts of the high pressure low density polyethylene resins enhance the properties of the ethylene-butene-1 copolymer. Film opticals, haze and gloss, show a synergistic improvement throughout the 1-20 wt. % addition of 2.4 melt index high pressure resin. With the 0.2 melt index high pressure resin, opticals improve up to a 10 wt. % addition. Mechanical property data show MD Elmendorf tear strength to increase at low concentrations of high pressure low density polyethylene additions and then decrease. TD tear strength generally increases throughout the addition. Film tensile strength shows an unexpected synergism with the addition of the 2.4 melt index high pressure low density polyethylene resin. Elongation values, MD and TD, for the films remain in excess of 600%. Tensile impact strength appears to become more balanced with the addition of small concentrations of of high pressure low density polyethylene.

MD tensile impact strength generally decreases while TD values increase. This effect holds up to 5 wt. % addition with both of the high pressure low density resins.

Secant modulus values also exhibit a synergistic increase with the addition of minor amounts of high pressure low density polyethylene.

TABLE III

Ethylene hydrocarbon copolymer/high pressure low density Polyethylene Blends

| Example | Low Density Polyethylene Resin Type | Conc. (Wt. %) | Haze (%) | 45° Gloss | Puncture Resistance (In-lbs/mil.) | Elmendorf Tear (gms/mil) MD | TD | Tensile Strength (Psi) MD | TD | Elongation (%) MD | TD | Tensile Impact (ft.-lbs/in$^3$) MD | TD | Secant Modulus (Psi) MD | TD |
|---|---|---|---|---|---|---|---|---|---|---|---|---|---|---|---|
| 19 | A | 0 | 14.2 | 46 | 12.7 | 67 | 242 | 3840 | 3300 | 694 | 750 | 1792 | 283 | 33000 | 34000 |
| 20 | A | 1 | 14.8 | 44 | 15.1 | 106 | 234 | 3910 | 4600 | 688 | 770 | 1682 | 774 | 32100 | 38100 |
| 21 | A | 5 | 9.3 | 61 | 16.6 | 86 | 253 | 4320 | 3840 | 676 | 742 | 1627 | 814 | 33100 | 34500 |
| 22 | A | 10 | 8.2 | 63 | 18.9 | 34 | 351 | 4770 | 3600 | 646 | 752 | 1326 | 635 | 33600 | 37700 |
| 23 | A | 20 | 7.1 | 71 | 18.8 | 33 | 344 | 4710 | 3670 | 630 | 682 | 561 | 541 | 34000 | 40700 |
| 24 | A | 100 | 8.1 | 55 | 6.8 | 262 | 85 | 2810 | 2040 | 196 | 522 | 527 | 826 | 22000 | 23500 |
| 25 | B | 1 | 12.5 | 48 | 16.3 | 82 | 223 | 3660 | 3590 | 688 | 774 | 1490 | 824 | 36000 | 38700 |
| 26 | B | 5 | 10.3 | 58 | 14.0 | 86 | 239 | 3660 | 3360 | 700 | 730 | 1155 | 851 | 34400 | 45900 |
| 27 | B | 10 | 7.9 | 62 | 16.7 | 50 | 366 | 3950 | 3010 | 646 | 738 | 802 | 565 | 33900 | 39800 |
| 28 | B | 20 | 8.2 | 56 | 15.8 | 62 | 283 | 3840 | 3300 | 636 | 682 | 584 | 842 | 34600 | 41200 |

EXAMPLES 29–34

Ethylene-butene-1 copolymers (Examples 29 and 30) prepared as in Example 1 and prior art ethylenebutene-1 copolymers (Examples 31 and 32) and a high pressure low density polyethylene resin (Union Carbide DYNH), Examples 33 and 34, with melt index, MFR and density, as set forth in Table IV, were extruded into 1.5 mil gauge film using a 2½ inch diameter, 24/1 L/D extruder fitted with a six inch diameter, spiral pin, blown film extrusion die. A 20/60/20 mesh screen pack was employed. Output rate was approximately 70 lbs/hr. Die temperature was set at 400° F. for Examples 29, 30, 33 and 34; 430° F. for Examples 31 and 32. Blow-up ratio was 2:1.

Shrinkage measurements were performed using a Perkin Elmer model TMS-1 Thermal Mechanical Analyzer (TMA). This instrument uses a Linear variable differential transformer to measure very small changes in specimen length. A 1/16 in.×3/16 in. specimen is mounted and an oven at some preset temperature is brought around the specimen. Specimen length can be followed as a function of time. The specimen was allowed to attain a steady state dimension in the sample oven and then removed and allowed to cool to room temperature. Shrinkage is reported after the heating and cooling cycle. In table IV MD shrinkage data are reported for several film samples at two oven temperatures.

The data of Table IV shows that the 1.7 melt index, 0.922 density narrow molecular weight distribution ethylene butene-1 copolymer exhibits virtually no shrinkage at 117° C., even when extruded using a 61 mil die gap. The prior art copolymer exhibits slight shrinkage at 105° C. This increases at 117° C. The high pressure, low density polyethylene resin shows slight shrinkage at 105° C. when extruded through a 30 mil die gap. This increases significantly when a 61 mil die gap is employed.

TABLE IV

| Example | Resin | Melt Index (g/10 min.) | MFR | Density (g/cm$^3$) | Die Gap(mils) | MD Film Shrinkage 105° C. | 117° C. |
|---|---|---|---|---|---|---|---|
| 29 | Ethylene-butene-1 copolymer | 1.7 | 26 | .922 | 30 | 0 | 0 |
| 30 | Ethylene-butene-1 copolymer | " | " | " | 61 | 0 | 0 |
| 31 | Prior Art Ethylene-butene-1 copolymer | 1.3 | 39 | .922 | 30 | 0 | 0.5 |
| 32 | Prior Art Ethylene-butene-1 copolymer | " | " | " | 61 | 1.8 | 4.5 |
| 33 | High pressure low density polyethylene | 2.4 | 50 | .918 | 30 | 0.8 | — |
| 34 | High pressure low density polyethylene | " | " | " | 61 | 7.0 | — |

EXAMPLES 35 TO 45

An ethylene-butene-1 copolymer, the base resin for Examples 35 to 41, prepared as in Example 1, and a prior art ethylene-butene-1 copolymer (Examples 42 and 43) and a high pressure low density polyethylene (Union Carbide DYNH), Examples 44 and 45, said resins having melt index, MFR and density as set forth in Table V, were extruded into 1.5 mil gauge film. Also, the copolymers of Examples 36 to 39 were blended with high pressure low density polyethylene (Union Carbide DYNH melt index 2.4, MFR 50 and density 0.918 g/cm$^3$), Resin C, in amounts as shown in Table V while the copolymer of Example 41 was blended with high pressure low density polyethylene (Union Carbide DFD-0600, melt index 0.7, density 0.922 g/cm$^3$), Resin D, in amounts as shown in Table V according to the procedure as set forth in Examples 19 to 25.

The resins were extruded into film using a 1½ inch diameter, 18/1 L/D extruder fitted with a three inch, spiral pin, blown film extrusion die having a gap as set forth in Table V. The screen pack measured 20/60/20. Output rate was approximately 27 lbs/hr. Die temperature was held at 400° F. Blow up ratio was 2:1.

high pressure low density polyethylene (which strain hardens in extensional deformation) permits orientation level and thus shrinkage to be controlled.

TABLE V

| | | Base resin | | | Blended resin | | Die gap | Oil Bath Shrinkage (%) 135° C. | |
|---|---|---|---|---|---|---|---|---|---|
| Example | Base resin | Melt Index (g/10min) | MFR | Density (g/cm³) | Type | Amt (wt %) | (mils) | MD | TD |
| 35 | Ethylene-butene-1 copolymer | 2.0 | 26 | 0.922 | — | — | 50 | 47 | 9 |
| 36 | Ethylene-butene-1 copolymer | " | " | " | C | 1 | " | 47 | 12 |
| 37 | Ethylene-butene-1 copolymer | " | " | " | C | 5 | " | 62 | 6 |
| 38 | Ethylene-butene-1 copolymer | " | " | " | C | 10 | " | 74 | |
| 39 | Ethylene-butene-1 copolymer | " | " | " | C | 20 | " | 76 | 3 |
| 40 | Ethylene-butene-1 copolymer | 1.7 | 26 | 0.922 | — | — | 61 | 63 | 1 |
| 41 | Ethylene-butene-1 copolymer | " | " | " | D | 10 | 61 | 73 | 0 |
| 42 | Ethylene-butene-1 copolymer (prior art) | 1.3 | 39 | 0.922 | — | — | 30 | 78 | 7 |
| 43 | Ethylene-butene-1 copolymer (prior art) | " | " | " | — | — | 60 | 81 | 12 |
| 44 | High Pressure Low Density Polyethylene | 2.4 | 50 | 0.918 | — | — | 30 | 82 | 17 |
| 45 | High Pressure Low Density Polyethylene | " | " | " | — | — | 50 | 83 | 12 |

Shrinkage measurements were performed on the film according to the following procedure: Film samples, three inches square, were immersed in a temperature controlled oil bath at 135° C. for 60 seconds, removed and allowed to cool to room temperature. The change in specimen dimensions was converted to % shrinkage, MD and TD.

The data of Table V shows that shrinkage is increased significantly at 135° C. The unmodified, narrow molecular weight distribution, ethylene hydrocarbon copolymer films of these Examples, however, still develop less shrinkage than the high pressure low density polyethylene film or the prior art ethylene-butene-1 copolymer film. Examples 36 to 39 show that the shrinkage behavior of the narrow molecular weight distribution ethylene hydrocarbon copolymer films can be conveniently controlled by the addition of small amounts of long chain brached, high pressure low density polyethylene.

The "unique" strain softening extensional rheology of the narrow molecular weight distribution ethylene hydrocarbon copolymers employed in this invention permit films to be produced which develop only limited levels of orientation. The addition of small amounts of

EXAMPLES 46 to 51

Ethylene-butene-1 copolymer (melt index 1.7 g/cm³, density of 0.922 g/cm³, MFR of 26 and TEA Volatiles of 0.1 wt. percent) prepared as in Example 1 were extruded in a blown film process using a 1½ inch diameter, 18/1 L/D extruded fitted with a three inch, spiral pin, blown film extrusion die. The screen pack measured 20/60/20 mesh. Output rate was approximately 27 lbs/hr. Die gap was 50 mils. Film was prepared at 1.5 mil gauge, 2:1 blow up ratio. Examples 50 and 51 were extruded using a 2½ inch diameter 24/1 L/D extruder fitted with a six inch spiral pin die. The screen pack measured 20/60/20 mesh. Output rate for these extrusions was approximately 68 lbs/hr. Die gap was 61 mils. Film was again 1.5 mil gauge and prepared at a 2:1 blow up ratio.

The die diameter, die gap and compound temperatures are set forth as in Table VI. The output rate as well as frost line height, extrudate residence time between die and frost line, cooling rate parameter, film haze, 60° gloss and 45° gloss are as set forth in Table VI.

TABLE VI

| | | | | Film Opticals and Cooling Rate | | | | | | | |
|---|---|---|---|---|---|---|---|---|---|---|---|
| Example | Extruder Description | Die Dia. (in.) | Die Gap (mils.) | Compound Temp. (°F.) | Output Rate (lbs/hr) | Frost Line Height (in.) | $\tau$ Extrudate Residence Time Between Die and Frostline (Sec) | $\phi^{(1)}$ Cooling Rate Parameter | Haze (%) | 60° Gloss | 45° Gloss |
| 46 | 1½ in. dia. 18/1 L/D | 3 | 50 | 425 | 27 | 13 | 4.7 | 27.6 | 20 | 76 | 35 |
| 47 | 1½ in. dia. 18/1 L/D | 3 | 50 | 425 | 27 | 5 | 2.0 | 11.7 | 8.5 | 136 | 60 |
| 48 | 1½ in. dia. 18/1 L/D | 3 | 50 | 440 | 27 | 13 | 4.7 | 23.9 | 20 | 73 | 41 |
| 49 | 1½ in. dia. 18/1 L/D | 3 | 50 | 440 | 27 | 5 | 2.0 | 10.1 | 7 | 144 | 70 |

TABLE VI-continued

Film Opticals and Cooling Rate

| Example | Extruder Description | Die Dia. (in.) | Die Gap (mils.) | Compound Temp. (°F.) | Output Rate (lbs/hr) | Frost Line Height (in.) | $\tau$ Extrudate Residence Time Between Die and Frostline (Sec) | $\phi^{(1)}$ Cooling Rate Parameter | Haze (%) | 60° Gloss | 45° Gloss |
|---|---|---|---|---|---|---|---|---|---|---|---|
| 50 | 2½ in. dia. 24/1 L/D | 6 | 61 | 435 | 68 | 28 | 8.9 | 44.8 | 18.8 | 77 | 26 |
| 51 | 2½ in. dia. 24/1 L/D | 6 | 61 | 435 | 68 | 10 | 3.2 | 16.1 | 11.7 | 129 | 48 |

$^{(1)}\phi = \tau(MI)^{.29}[(Tm-Tc/Tm]^{-1}$ where $\tau$ is previously defined.

Table VI illustrates the effect of frost line height, i.e., cooling rate, on the optical properties of blown film extruded from a 1.7 melt index, 0.922 density, narrow molecular weight distribution ethylene-butene-1 copolymer.

The data of Table VI demonstrates a very unique feature of the narrow molecular weight distribution ethylene hydrocarbon copolymers employed in the present invention. By controlling cooling rate blown film was prepared from one base resin possessing film opticals ranging from 20% haze with a 45° gloss of 41 to 7% haze and a 45° gloss of 70. High pressure low density polyethylene films and prior art ethylene hydrocarbon copolymer films do not show this extreme sensitivity of film opticals to cooling rate, i.e., frost line height.

The ethylene hydrocarbon copolymers employed in the present invention possess a short chain branching distribution which is very broad. These materials can develop large spherulities during cooling, much larger than those developed with high pressure low density polyethylene resins of similar melt index and density. It has been found that by carefully controlling the extrudate cooling rate during the blown film extrusion process, film, possessing a very wide range of optical properties can be prepared from one base resin.

EXAMPLES 52 to 54

Ethylene-butene-1 copolymer (melt index 1.7 g/cm³ and density of 0.920 g/cm³) prepared as in Example 1 were extruded in a blown film process using a 2½ inch diameter, 18/1 L/D extruder fitted with a six inch, spiral pin, blown film extrusion die. The extrusion screw had a feed section of 12.5 inches, transition section of 7.5 inches, a metering section of 20 inches, and a mixing section of 5 inches. The mixing section was a fluted mixing section with the following characteristics: a diameter of 2.5 inches; 3.0 inch channels; channel radius of 0.541 inches; mixing barrier land width of 0.25 inches; cleaning barrier land width of 0.20 inches; and a mixing barrier length of 4.5 inches. The void in the barrel was filled by a plug 2.496 inches in diameter, 11.0 inches long which contained a static mixer 9.0 inches long and 1.0 inch in diameter. The screen pack measured 20/60/20 mesh. Output rate was approximately 60 lbs/hr. Die gap was 60 mils. Film was prepared at 1.5 mil gauge, 2:1 blow up ratio. In Example 53, 2.5 parts per million (ppm) of phthalocyanine green pigment was added to said copolymer via a high pressure low density concentrate (¼% concentrate). In Example 54, 15 ppm of phthalocyanine green pigment was added to said copolymer via a high pressure low density concentrate (1.5% concentrate). The concentrate was composed of 99.9 wt % of a high pressure low density polyethylene (Union Carbide DYNH) and 0.1 wt % phthalocyanine green pigment and was prepared via hot compounding. This concentrate was then dry blended with the granular copolymer resin and extruded into film. As indicated in Table VII, up to 1.5% of the high pressure low density polyethylene in said ethylene butene-1 copolymer should have a negligible effect on film opticals, as compared to the opticals of film made from the copolymer itself without the addition of the pigment thereto (Example 52).

The frost line height, 45° gloss and film haze are as set forth in Table VII.

TABLE VII

Heterogeneous Nucleation Effects on Film Opticals

| Example | Frost Line Height (in.) | 45° Gloss | Haze |
|---|---|---|---|
| 52 | 18 | 35–40 | 25–30 |
| 53 | 18 | 40–45 | 18 |
| 54 | 18 | 50 | 12.5 |

EXAMPLES 55–56

The spherulite size of an ethylene-butene-1 copolymer of melt index 1.35 g/cm³ and density of 0.921 g/cm³ prepared as in Example 1 was measured (Example 55). In Example 56 the spherulite size of said ethylene-butene-1 copolymer to which 2.5 ppm phthalocyanine pigment was added via hot compounding, was also measured.

The spherulite size was determined as follows: Photomicrographs of spherulites were taken with a polarizing light microscope at 450X. A small amount of resin was sandwiched between a glass slide and covered glass and heated on the slidewarmer at 200°–220° C. for about 20 seconds. During this time, sufficient pressure was applied to the molten resin to prepare a film of approximately 10μ. in thickness. The slide was removed and quickly cooled under pressure. It is estimated that the sample cooled from 210° C. to 50° C. in 3 to 5 seconds. The results are set forth in Table VIII as follows:

TABLE VIII

Heterogeneous Nucleation Effects on Spherulite Size

| Example | Spherulite size (μ) |
|---|---|
| 55 | 5–10 |
| 56 | ~1 |

EXAMPLE 57

Ethylene-butene-1 copolymer (melt index 0.5 to 5.6, density 0.921–0.925 g/cm³, MFR of approximately 26) prepared as in Example 1 was extruded in a blown film process using a 1½ inch diameter, 18/1 L/D extruder fitted with a three inch, spiral pin, blown film extrusion die. The screen pack measured 20/60/20 mesh. Output rate was approximately 27 lbs/hr. Film was prepared at 1.5 mil gauge, 2:1 blow up ratio. Initial extrusion used a die gap of 30 mils. Die temperature was 400° F.

Dart drop data, as measured according to ASTM test procedure 1709 and normalized by film gauge, are plotted versus resin melt index in FIG. 5. The data exhibit a pronounced maxima at approximately 1.5 Melt Index. This maxima is caused by melt fracture phenomena. Using the blown film extrusion conditions outlined above, the ethylene/butene copolymer resins of the present invention melt fractured when their melt index was less than about 1.5. The rheologically induced distortions of the film surface caused by this phenomenon act as stress concentration points during ultimate property testing. They act as macroscopic flaws, which initiate premature film failure.

When the blown film extrusion described above was carried out using a 50 mil die gap, melt fracture was not observed for resins of Melt Index less than about 1.5. The gauge normalized dart drop data did not exhibit a property maxima as shown in FIG. 5. Wide die gap extrusion eliminated melt fracture and significantly upgraded the dart drop strength of the low melt index ethylenebutene-1 copolymers so extruded.

What is claimed is:

1. A process for forming blown tubular film essentially free of melt fracture from an extrudate formed from molten ethylene hydrocarbon copolymer, said copolymer having been made from $\geq 90$ mol percent of ethylene and $\leq 10$ mol percent of at least one $C_3$ to $C_8$ alpha olefin monomer with a transition metal based catalyst and having a narrow molecular weight distribution and a melt index of about $\geq 0.1$ to about $\leq 5.0$ and being susceptible to melt fracture in blown tubular film form when extruded into such form through an extrusion die having a die gap of 15 to $\leq 45$ mils, which comprises extruding said copolymer into such form through an extrusion die having a die gap of greater than about 50 mils and at a drawdown ratio of greater than about 2 to less than about 250.

2. A process as in claim 1 in which said copolymer has a melt index of about $>0.5$ to $\leq 4.0$.

3. A process as in claim 1 in which said copolymer has a density of about $\geq 0.912$ to $\leq 0.940$.

4. A process as in claim 3 in which said copolymer has a molecular weight distribution of about $\geq 2.7$ to $\leq 3.6$ and a total unsaturation content of about $\geq 0.1$ to $\leq 0.3$ C=C/1000 C atoms.

5. A process as in claim 3 in which said copolymer has a melt flow ratio of about $\geq 22$ to $\leq 36$ and a total unsaturation content of about $\geq 0.1$ to $\leq 0.3$ C=C/1000 C atoms.

6. A process as in claim 1 in which said copolymer has a molecular weight distribution of about $\geq 2.7$ to $\leq 3.6$.

7. A process as in claim 6 in which the alpha olefin comprises butene-1.

8. A process as in claim 7 in which the die gap is greater than about 50 to less than about 120 mils.

9. A process as in claim 8 in which said gap is greater than about 50 to less than about 90 mils.

10. A process as in claim 1 in which said film is formed at a drawdown ratio of about 25 to less than about 150.

11. A process as in claim 1 in which said copolymer is formed into film having a thickness greater than about 0.1 to about 20 mils.

12. A process as in claim 11 in which said film has a thickness of greater than about 0.1 to about 6.0 mils.

13. A process as in claim 12 in which said film has an ultimate elongation of greater than about 400 percent.

14. A process as in claim 12 in which said film has a puncture resistance of greater than about 7.0 in-lb./mil.

15. A process as in claim 12 in which said film has a tensile impact strength of greater than about 400 to about 2000 ft.-lbs./in$^3$.

16. A process as in claim 12 in which said film has a tensile strength of greater than about 2000 to about 7000 psi.

17. A process as in claim 1 in which said film is formed from a composition comprising
about 99 to 80 weight percent of said ethylene hydrocarbon copolymer and,
about 1 to 20 weight percent of high pressure low density of polyethylene having a melt index of about 0.2 to about 5.0.

18. A process as in claim 17 in which said composition comprises about 2 to about 12 weight percent of said high pressure low density of polyethylene.

19. A process as in claim 18 in which said high pressure low density polyethylene has a melt index of about 0.2 to about 5.0.

20. A process as in claim 18 in which said copolymer has a melt flow ratio of about $\geq 22$ to $\leq 36$ and a total unsaturation content of about $\geq 0.1$ to $\leq 0.3$ C=C/1000 C atoms.

21. A process as in claim 20 in which said copolymer has a molecular weight distribution of about $\geq 2.7$ to $\leq 3.6$.

22. A process as in claim 21 in which the alpha olefin comprises butene-1.

23. A process as in claim 22 in which the die gap is greater than about 50 mils to less than about 120 mils.

24. A process as in claim 23 in which said die gap is greater than about 50 mils to less than about 90 mils.

25. A process as in claim 1 wherein the extruded copolymer is cooled to form a frost line providing improved optical properties in the film product according to the following relationships:

$$45° \text{ specular gloss} = 336.4 \, \phi^{-0.664}$$

wherein
$\phi$ is a cooling rate parameter
$\phi = \tau \, (MI)^{0.29}[(Tm-Tc)/Tm]^{-1}$
Tc = resin crystallization temp. (K°)
Tm = compound temp. (K°)
MI = resin melt index (grams/10 min.)
$\tau$ = residence time of extrudate between the die and the frost line (sec.), and wherein
$\tau$ is calculated assuming, that to a first approximation, extrudate extension between the die and the frost line height is a constant strain rate deformation, wherein $$\tau = \frac{FLH}{V_1 - V_0} \ln \frac{V_1}{V_0}$$

where
FLH = frost line height (cm.)
$V_1$ = linear nip roll velocity (cm/sec)
$V_0$ = average linear extrudate velocity at the die exit (cm/sec) and is calculated as $$V_0 = Q/\rho m \pi DG$$

where
Q = extruder output rate (grams/sec)
$\rho m$ = melt density (grams/cm$^3$)
D = die diameter (cm) and
G = die gap (cm).

* * * * *